United States Patent
Kikuchi

(10) Patent No.: US 9,143,846 B2
(45) Date of Patent: Sep. 22, 2015

(54) WAVELENGTH-MULTIPLEXED OPTICAL TRANSMISSION DEVICE, WAVELENGTH-MULTIPLEXED OPTICAL TRANSMISSION SYSTEM, WAVELENGTH-MULTIPLEXED OPTICAL TRANSMISSION METHOD

(71) Applicant: HITACHI, LTD., Tokyo (JP)

(72) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/353,049

(22) PCT Filed: Nov. 5, 2012

(86) PCT No.: PCT/JP2012/078612
§ 371 (c)(1),
(2) Date: Apr. 21, 2014

(87) PCT Pub. No.: WO2013/073398
PCT Pub. Date: May 23, 2013

(65) Prior Publication Data
US 2014/0286637 A1    Sep. 25, 2014

(30) Foreign Application Priority Data
Nov. 14, 2011    (JP) .................. 2011-248677

(51) Int. Cl.
*H04Q 11/00* (2006.01)
*H04J 14/02* (2006.01)

(52) U.S. Cl.
CPC ............ *H04Q 11/0005* (2013.01); *H04J 14/02* (2013.01); *H04J 14/0212* (2013.01); *H04J14/0267* (2013.01); *H04Q 11/0067* (2013.01); *H04Q 2011/0015* (2013.01); *H04Q 2011/0016* (2013.01)

(58) Field of Classification Search
CPC .......... H04Q 11/0005; H04Q 11/0067; H04Q 2011/0015; H04Q 2011/0016; H04J 14/02; H04J 14/0267; H04J 14/0212
USPC .......................................... 398/48–50, 82–84
See application file for complete search history.

(56) References Cited

U.S. PATENT DOCUMENTS

| 2005/0213879 A1* | 9/2005 | Wang et al. ................ 385/24 |
| 2011/0085803 A1* | 4/2011 | Ji et al. ........................ 398/79 |

(Continued)

FOREIGN PATENT DOCUMENTS

| JP | 2010-050649 A | 3/2010 |
| JP | 2010-098544 A | 4/2010 |
| WO | 2011/030897 A1 | 3/2011 |

OTHER PUBLICATIONS

Winzer et al., "Spectrally Efficient Long-Haul Optical Networking Using 112-Gb/s Polarization-Multiplexed 16-QAM", Journal of Lightwave Technology, vol. 28, No. 4, Feb. 15, 2010, pp. 547-556.

*Primary Examiner* — Dalzid Singh
(74) *Attorney, Agent, or Firm* — Mattingly & Malur, PC

(57) ABSTRACT

Provided is a wavelength division multiplexing (WDM) optical transmission device which is suitable of performing splitting, wavelength multiplexing, switching, and routing on an optical WDM signal in which optical signals having a spectrum close to a rectangle are arranged with a high density, and efficiency of spectral usage is ultimately high in units of wavelengths. A WDM optical transmission device according to the present invention is configured to cause flat portions of adjacent transmission bands on a wavelength spectrum overlap each other.

14 Claims, 18 Drawing Sheets

(56) References Cited

U.S. PATENT DOCUMENTS

2011/0188853 A1* 8/2011 Schimpe .................. 398/38
2012/0195592 A1* 8/2012 Barnard et al. ............ 398/48
2012/0201541 A1* 8/2012 Patel et al. ................ 398/58

* cited by examiner

FIG. 1
(1) WDM signals
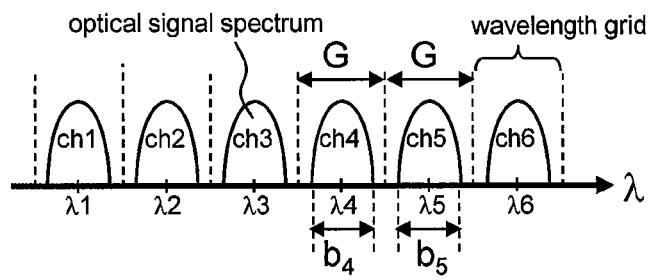
(2) WDM signals with rectangular spectrum
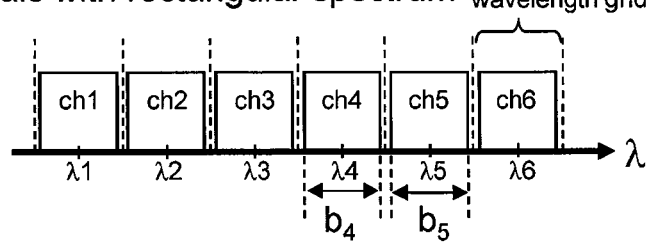
(3) WDM signals with Nyquist filtering
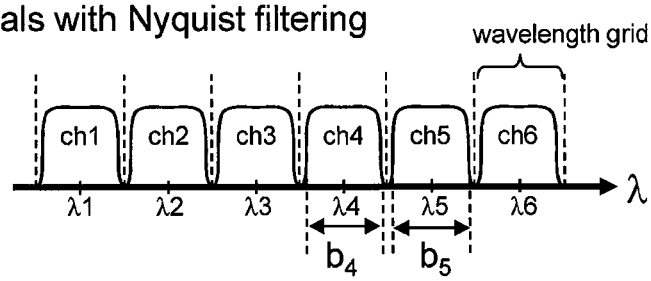
(4) WDM signal with multicarrier modulation
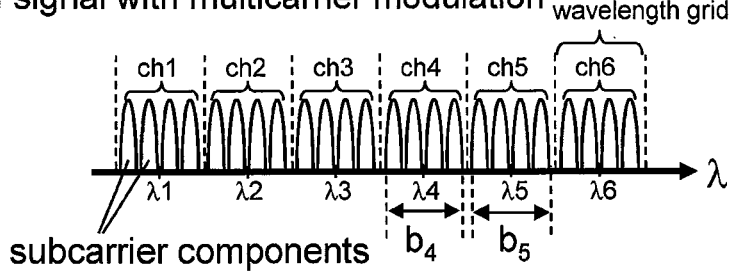
(5) WDM signals with OFDM
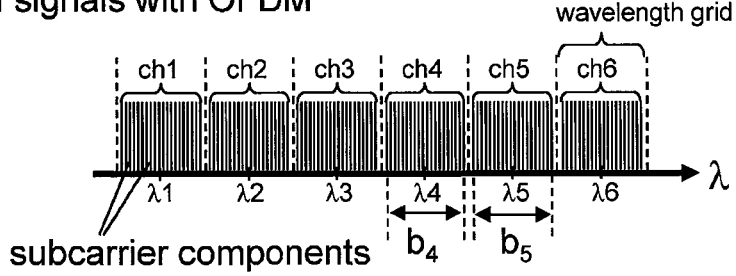

FIG. 4
(1) WDM input signal
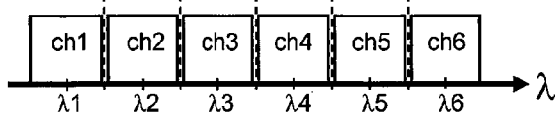
(2) Transmittance to output fiber 103-1
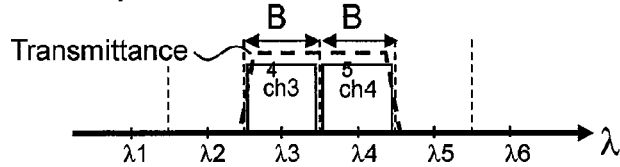
(3) Output optical signals 104-1
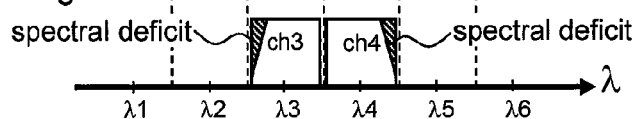
(4) Output optical signals 104-2
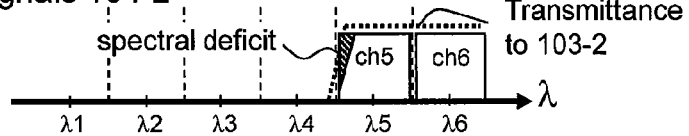
FIG. 5
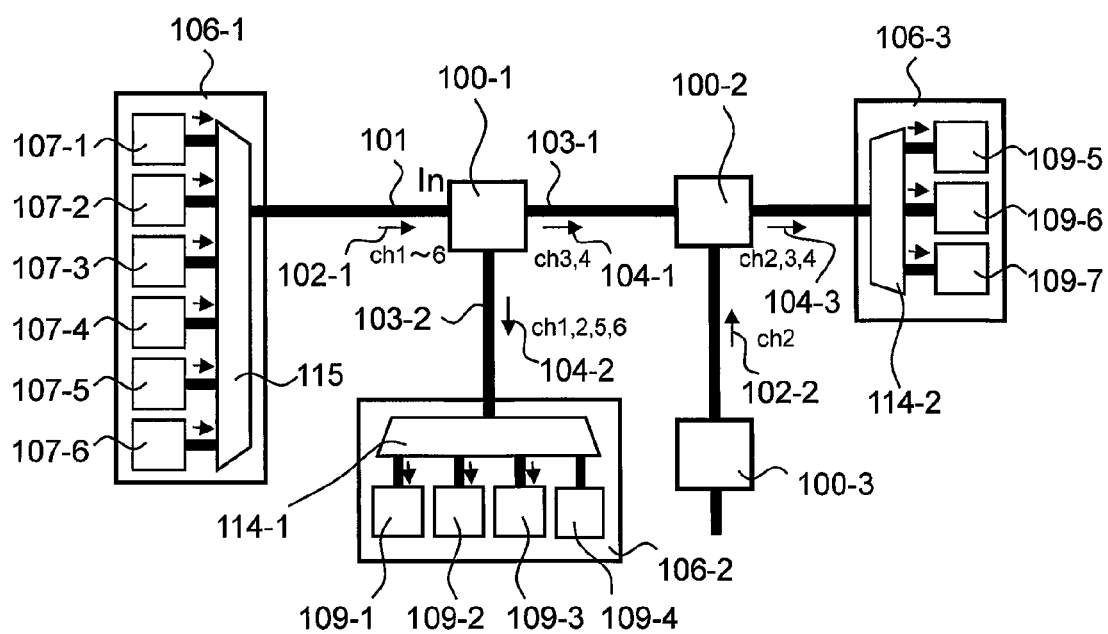

FIG. 14
(1) WDM input signal
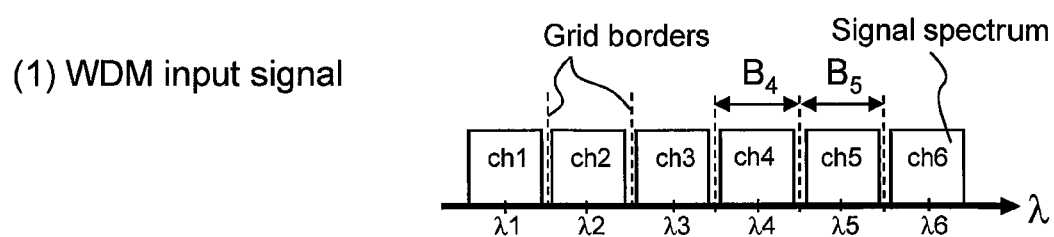
(2) Transmittance to output fiber 103-1 and output optical signals
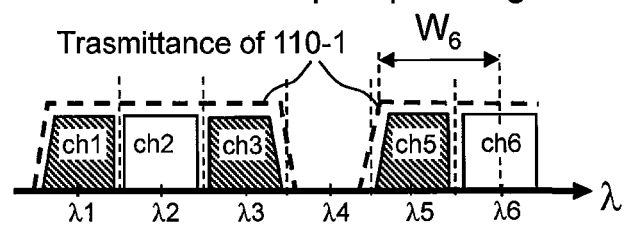

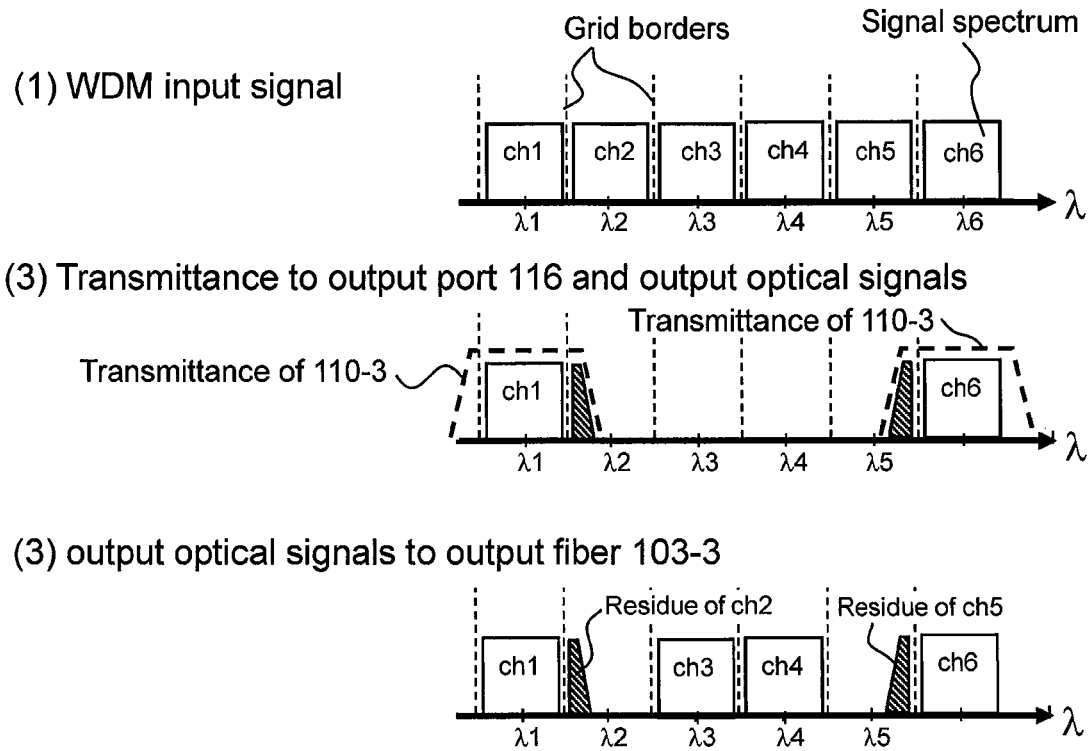

FIG. 20

(1) State change when ch-i is blocked

| | | Original ch-i state | | | | |
|---|---|---|---|---|---|---|
| | | Vacant | In use | Residue at shorter side | Residue at longer side | Residue at both side |
| Output states | ch i-1 transmitted | Vacant | Residue at shorter side | Residue at shorter side | Residue at shorter side | Residue at shorter side |
| | ch i+1 transmitted | Vacant | Residue at longer side | Residue at longer side | Residue at longer side | Residue at longer side |
| | ch i-1 and i+1 transmitted | Vacant | Residue at both side | Residue at both side | Residue at both side | Residue at both side |
| | Otherwise | Vacant | Vacant | Vacant | Vacant | Vacant |

(2) State change when ch-i is transmitted

| | Original ch-i state | | | | |
|---|---|---|---|---|---|
| | Vacant | In use | Residue at shorter side | Residue at longer side | Residue at both side |
| Output states | Vacant | In use | Residue at shorter side | Residue at longer side | Residue at both side |

(3) State change when ch-i is added

| | Original ch-i state | | | | |
|---|---|---|---|---|---|
| | Vacant | In use | Residue at shorter side | Residue at longer side | Residue at both side |
| Output states | Vacant | In use | In use | In use | In use |

WAVELENGTH-MULTIPLEXED OPTICAL TRANSMISSION DEVICE, WAVELENGTH-MULTIPLEXED OPTICAL TRANSMISSION SYSTEM, WAVELENGTH-MULTIPLEXED OPTICAL TRANSMISSION METHOD

TECHNICAL FIELD

The present invention relates to a wavelength selective switch that selects a high-density wavelength division multiplexed optical signal for each wavelength band in optical fiber communication and outputs the selected signal to an optical fiber transmission path.

BACKGROUND ART

A wavelength division multiplexing (WDM) optical transmission scheme of multiplexing a plurality of optical signals having different wavelengths in a single optical fiber and transmitting information is an very effective technique for implementing high capacity optical fiber communication.

A reconfigurable optical add drop multiplexer (ROADM) or a wavelength selective switch (WSS) is a type of an optical switch arranged at each node in an optical fiber network in which a WDM signal is transmitted. The ROADM is a general term for techniques, devices, or apparatuses used to split (drop) only a signal of a necessary wavelength from a WDM signal mainly transmitted through an optical fiber and receives the split signal or to add a wavelength signal transmitted from a current node to a WDM signal. The WSS is a WDM signal switching technique to which advanced wavelength selecting and routing functions are added, and can select an arbitrary number of signal wavelengths from a WDM signal in an input optical fiber line and output the selected arbitrary number of signal wavelengths to any one of an arbitrary number of (a plurality of) output fibers or extract optical signals of an arbitrary wavelength from WDM signals in a plurality of input fibers and output the extracted optical signals to an output fiber.

The optical switching technique attracts public attention due to its convenience as a technique essential for flexibly setting a wavelength line according to the growth of an optical network or a change in traffic in each region and implementing a ring or mesh network which is high in fault tolerance or traffic accommodation efficiency. Hereinafter, in this specification, the ROADM technique and the WSS technique are collectively referred to as a "wavelength selective switch (WSS)."

The representative scheme of WDM optical transmission has been described above. Next, a WDM technique to which the WSS technique is applied will be described.

FIG. 1 is a diagram illustrating an example of a wavelength spectrum of a WDM signal. FIG. 1(1) illustrates an optical signal spectrum of WDM according to a related art. Each of ch1 to ch6 is a channel of an optical signal modulated by a high-speed information signal of 2.5 to 100 gigabits/second or the like, and each optical signal is a spectrum having a width of several to several tens of 10 GHz by high-speed modulation. Each of $\lambda 1$ to $\lambda 6$ is a center wavelength (or a center frequency) of each channel, and for an absolute wavelength and spacing thereof, an arrangement standardized as a wavelength grid by the International Telecommunication Union (ITU) is used.

In FIG. 1, G represents spacing of a wavelength grid. As a general wavelength grid, for example, those having spacing of 200 GHz, 100 GHz, 50 GHz, or 25 GHz are used. Since an impairment is caused due to interference when a spectrum of an optical channel overlaps a spectrum of an adjacent channel, each optical channel has a grid spacing G larger than a spectrum width (b4 or b5 in FIG. 1) of each signal, and a sufficient gap (for example, about 10 to 20% of channel spacing) is given between channels. Particularly, when wavelength splitting is performed by the WSS or the ROADM above, a wavelength is split using this gap portion.

Meanwhile, an amount of information transmitted in an optical network gradually increases yearly, and in recent high-speed optical fiber transmission, the application of a ultrahigh-speed signal in which a transmission rate per wavelength exceeds 100 gigabits/second has been under review. Further, since there is a limitation to a wavelength band that can be used for long-distance transmission, the application of a high-efficiency modulation format such as optical multilevel transmission of cramming a lot of information in a limited wavelength (frequency) band and thus improving efficiency of spectral usage has been under review. As an example of this technique, for example, there is a technique disclosed in NPL 1.

In NPL 1, information of 8 bits per symbol is crammed by multilevel (or sixteen-level) modulation and polarization multiplexing technique, and high-efficiency transmission is performed using a high-sensitivity coherent homodyne receiver having wavelength/polarization selectivity.

FIGS. 1(2) to 1(4) illustrate exemplary wavelength spectrums of optical modulation formats in which efficiency of spectral usage is further improved than in FIG. 1(1). A normal optical signal has a rounded signal spectrum (for example, a raised cosine type) in which intensity is high at the center of a wavelength and intensity decreases as a distance from the center increases as illustrated in FIG. 1(1). In this spectrum, usage efficiency of a frequency component away from the center in a spectrum width (b4 in the case of ch4 in FIG. 1) of a signal is known to decrease. Ideally, it is possible to cram more information in a specified bandwidth using an optical signal of a rectangular spectral shape as illustrated in FIG. 1(2). Further, it is possible to improve the efficiency of spectral usage up to the limit by eliminating a gap between channels.

Practically, it is difficult to generate an optical signal of a rectangular spectral shape perfectly, but as a technique of obtaining a signal close to a rectangle in a pseudo manner as illustrated in FIG. 1(3), there is a technique of applying Nyquist filtering to a modulation signal. Further, it is possible to improve the efficiency of spectral usage by setting a plurality of subcarriers in a certain bandwidth of a channel, performing optical multilevel modulation on each of the subcarriers, and keeping spectrum intensity in a bandwidth constantly as illustrated in FIG. 1(4). The same effect is obtained by orthogonal frequency division multiplexing (OFDM) (FIG. 1(5)) of generating a plurality of low-speed orthogonal carriers using digital signal processing. Although any of such modulation is used, it is possible to further improve information transmission efficiency by densely allocating channels at minimum spacing between adjacent wavelength channels.

The basic scheme of performing wavelength division multiplexing (WDM) on an optical signal has been described above. Next, splitting of a WDM signal using a WSS according to a related art will be described.

FIG. 2 is a diagram illustrating a configuration of a WSS node 100 according to a related art. The WSS node 100 is a network node in which a WSS of a related art is mounted. The WSS node 100 has a function of arbitrarily splitting a WDM signal input from a single input optical fiber line 101 for each wavelength channel and outputting the split WDM signals to two output optical fiber lines 103-1 and 103-2. Generally, a pair of an uplink and a downlink is used as an optical fiber line, but the present invention will be described in view of only signal transmission of one direction since no problem related to directivity particularly occurs.

FIG. 3 is a diagram illustrating a relation between an optical signal and a transmission band of the WSS node 100 according to the related art. A WDM signal 102 input from the input optical fiber line 101 is assumed to include 6 wavelength signals of channels 1 to 6 (wavelengths λ1 to λ6), and signal spectrum thereof are illustrated in FIG. 3(1). In the example illustrated in FIG. 3, in the WDM signal 102, signals of the channels 3 and 4 are assumed to be split and output to the output optical fiber line 103-1, and optical signals of the channels 5 and 6 are assumed to be split and output to the output optical fiber line 103-2.

The WSS of the related art is configured with a liquid crystal MEMS switch, a spatial diffraction grating, and the like, and has a function of changing transmittance to each output fiber with wavelength spacing corresponding to a wavelength grid using a border (a grid border) of a wavelength grid as a border line. In this regard, for the output optical fiber line 103-1, a transmission band is set as illustrated in FIG. 3(2) so that input light transmits in the grids (corresponding to bands B4 and B5) of the wavelengths λ3 and λ4. As a result, the wavelength channels 3 and 4 can be output to the output optical fiber line 103-1 as an output WDM signal 104-1 as illustrated in FIG. 3(3).

Similarly, for the output optical fiber line 103-2, a transmittance is set as illustrated in FIG. 3(4) so that input light transmits in the grids of the wavelengths λ5 and λ6. As a result, the wavelength channels 5 and 6 can be output to the output optical fiber line 103-2 as an output WDM signal 104-2.

An effect of splitting the channel 4 and the channel 5 which are channels adjacent to each other is obtained by an action between steeply inclined portions (shoulder portions) of transmittance (FIG. 3(2)) for transmitting the channel 4 and transmittance (FIG. 3(4)) for transmitting the channel 5. Thus, in order to properly splitting a wavelength, the inclined portion of the transmittance needs to exactly overlap the grid border.

FIG. 3(6) illustrates a state in which the transmittance of FIG. 3(2) and the transmittance of and FIG. 3(3) are displayed to overlap. V4 represents a width of transmittance to the output optical fiber line 103-1 from the center wavelength (λ4) of the wavelength channel 4 which is measured at the wavelength channel 5 side. V5 represents the width of transmittance to the output optical fiber line 103-2 from the center wavelength (λ5) of the wavelength channel 5 which is measured at the wavelength channel 4 side. A measurement target is a range of a portion (loss of about 0.5 to 1 dB) in which a characteristic shape of a transmission band is almost flat.

In FIG. 3(6), each of the two transmittances has an inclined portion between both channels, and a sum of V4 and V5 is smaller than channel spacing (λ5−λ4) between both channels. Thus, in the WSS of the related art, the flat portions (the ranges of V4 and V5 indicated by arrows) of the transmission bands of the optical signals of the adjacent channels do not overlap.

CITATION LIST

Non-Patent Literature

NPL 1: "Spectrally Efficient Long-Haul Optical Networking Using 112-Gb/s Polarization-Multiplexed 16-QAM", JOURNAL OF LIGHTWAVE TECHNOLOGY, VOL. 28, NO. 4, Feb. 15, 2010, pp. 547-556

SUMMARY OF INVENTION

Technical Problem

In the WSS of the related art, when wavelengths of ultra-dense wavelength division multiplexing (DWDM) signals in which wavelength spacing is densely arranged, adjacent channels are close to each other, and thus wavelength band spacing is almost zero are split as illustrated in FIGS. 1(2) to 1(5), there is a problem in that a spectrum of an optical signal is partially in deficit.

FIG. 4 is a diagram illustrating an example in which a wavelength spectrum of an ultra-DWDM signal is partially in deficit. A WSS node is assumed to have the same configuration as the WSS node 100 described with reference to FIG. 2.

FIG. 4(1) illustrates an example of a WDM signal in which a spectrum has a rectangular shape, and channel spacing is densely arranged. Similarly to the examples illustrated in FIG. 2 to FIG. 3, for the output optical fiber line 103-1, a transmission band is set so that optical signals of grids (bands B4 and B5) of wavelengths λ3 and λ4 transmit. In this case, inclined portions of the transmission band partially overlap optical signals of channels 3 and 4 as illustrated in FIG. 4(2). Thus, an output signal spectrum is in deficient at the short wavelength side of the signal spectrum of the channel 3 and the long wavelength side of the signal spectrum of the channel 4 as illustrated in FIG. 4(3). This situation occurs similarly in the output WDM signal 104-2 to be output to the output optical fiber line 103-2 as illustrated in FIG. 4(4), and an output wavelength spectrum is in deficit at the short wavelength side of the channel 5 overlapping the inclined portion of the transmission band.

Theoretically, a spectrum deficit can be solved if filtering can be implemented so that a spectral shape close to a rectangle is obtained by sharpening an inclination of a WSS transmission band, but it is difficult in practice. This is because the WSS is implemented by a spatial optical switch such as a MEMS or an optical device such as a wave guide, and thus there is a limitation to improving the manufacturing accuracy or the integration degree, and it is difficult to implement steep high-order optical filter characteristics. Further, there is a problem in that it is structurally likely to be influenced by disturbance such as temperature or pressure.

For example, spacing (B4 and B5 in FIG. 4(2)) of the wavelength grid is assumed to be 50 GHz. The signal spectrum spacing between the channel 3 and the channel 4 is decided according to a method of generating a transmission signal. Spectrum spacing of about several hundreds of MHz to 1 GHz can be easily implemented by a combination of high-speed electrical signal processing such as high-speed digital signal processing, subcarrier generation, and rectangular filtering of an electric stage. Meanwhile, the WSS can cause the inclined portion of the transmission band characteristic to be as steep as only the width of about 5 to 10% (2.5 to 5 GHz) of the transmission band due to the above problems. Further, the WSS has a problem in long-term stability or temperature stability, and it is difficult to implement the wavelength accuracy of 1 GHz or less. Thus, it is difficult to split optical signal spectrums which are allocated with a high density which will be implemented in the future using the WSS technique.

The present invention was made in light of the foregoing, and it is an object of the present invention to provide a wavelength division multiplexing (WDM) optical transmission device which is capable of performing splitting, wavelength multiplexing, switching, and routing on an optical WDM signal in which optical signals having a spectrum close to a rectangle are arranged with a high density, and efficiency of spectral usage is ultimately high in every wavelength.

Solution to Problem

A WDM optical transmission device according to the present invention is configured to cause flat portions of adjacent transmission bands on a wavelength spectrum to overlap.

Advantageous Effects of Invention

According to the WDM optical transmission device of the present invention, it is possible to suppress a deficit in a signal spectrum when WDM signals closely arranged with a high density are selected, extracted, and transmitted to an arbitrary optical fiber transmission path in every wavelength.

BRIEF DESCRIPTION OF DRAWINGS

FIG. 1 is a diagram illustrating an example of a wavelength spectrum of a WDM signal.

FIG. 4 is a diagram illustrating an example in which a wavelength spectrum of an ultra-DWDM signal is partially in deficit.

FIG. 5 is a configuration diagram illustrating WSS nodes 100-1 and 100-2 according to a first embodiment and a WDM optical network using the same.

FIG. 14 is a diagram illustrating a relation between an optical signal spectrum and a transmission band of a WSS node of a related art.

FIG. 18 is a diagram illustrating a relation between an optical signal spectrum and a transmission band of the WSS node 100 according to the sixth embodiment.

FIG. 19 is a diagram illustrating an example of wavelength management information used by the WSS node 100 according to the sixth embodiment.

FIG. 20 is a diagram illustrating an example of a state transition table of wavelength management information described with reference to FIG. 19.

DESCRIPTION OF EMBODIMENTS

First Embodiment

FIG. 5 is a configuration diagram illustrating WSS nodes 100-1 and 100-2 according to a first embodiment of the present invention and a WDM optical network using the same. In FIG. 5, a plurality of optical nodes 106-1 to 106-3 and the WSS nodes 100-1 and 100-2 according to the first embodiment are arranged.

Figure 2:
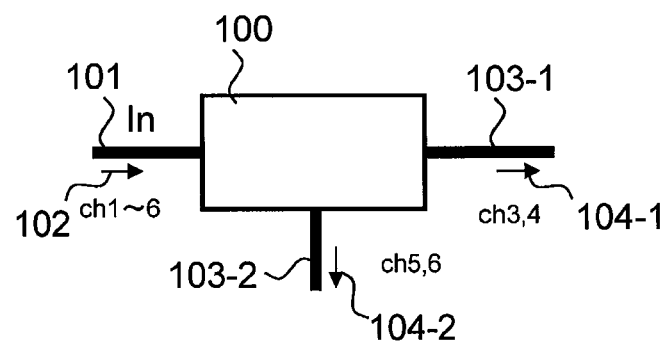
FIG. 2 is a diagram illustrating a configuration of a WSS node 100 according to a related art.
Figure 3:
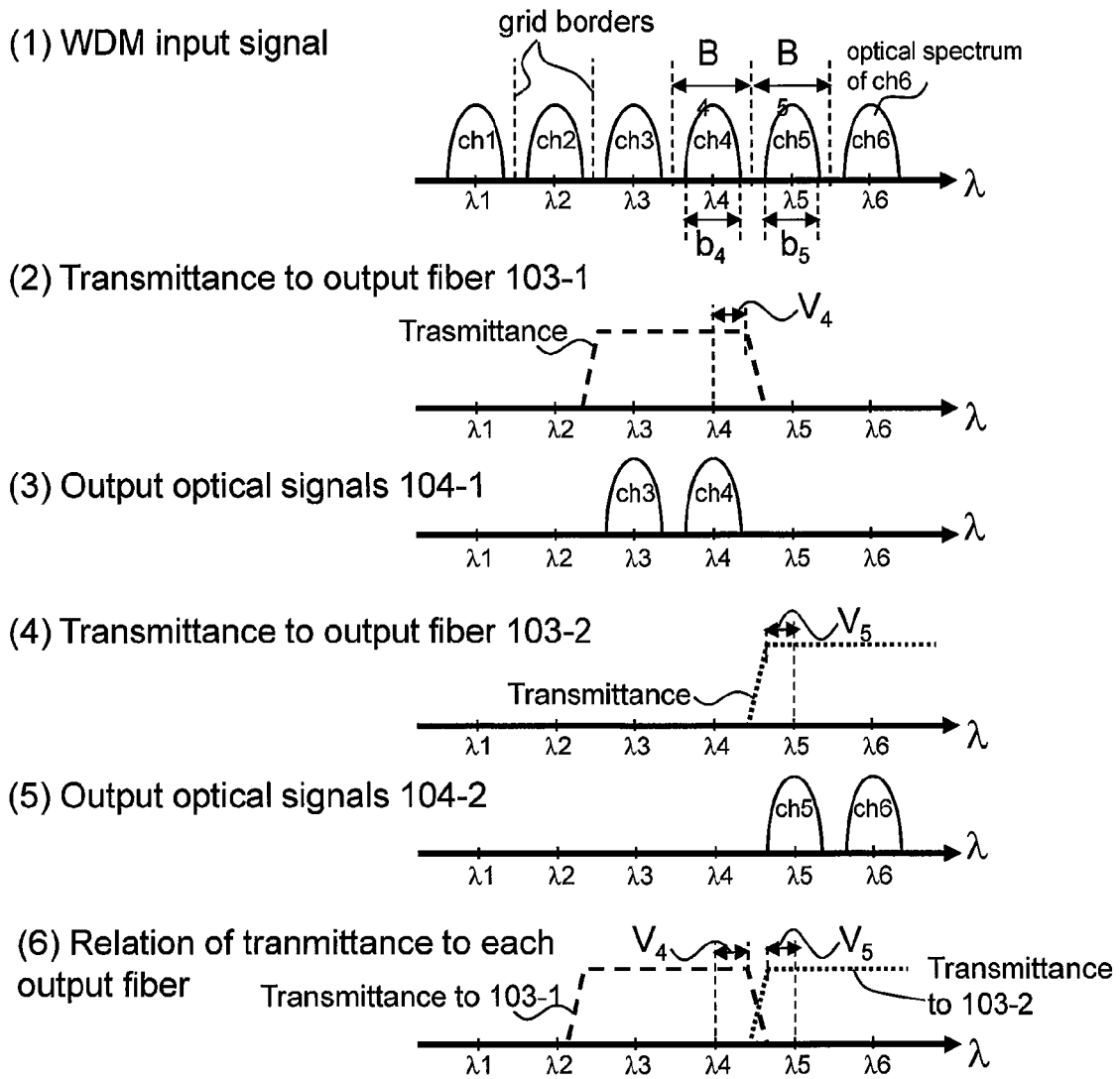
FIG. 3 is a diagram illustrating a relation between an optical signal and a transmission band of the WSS node 100 according to the related art.
Figure 6:
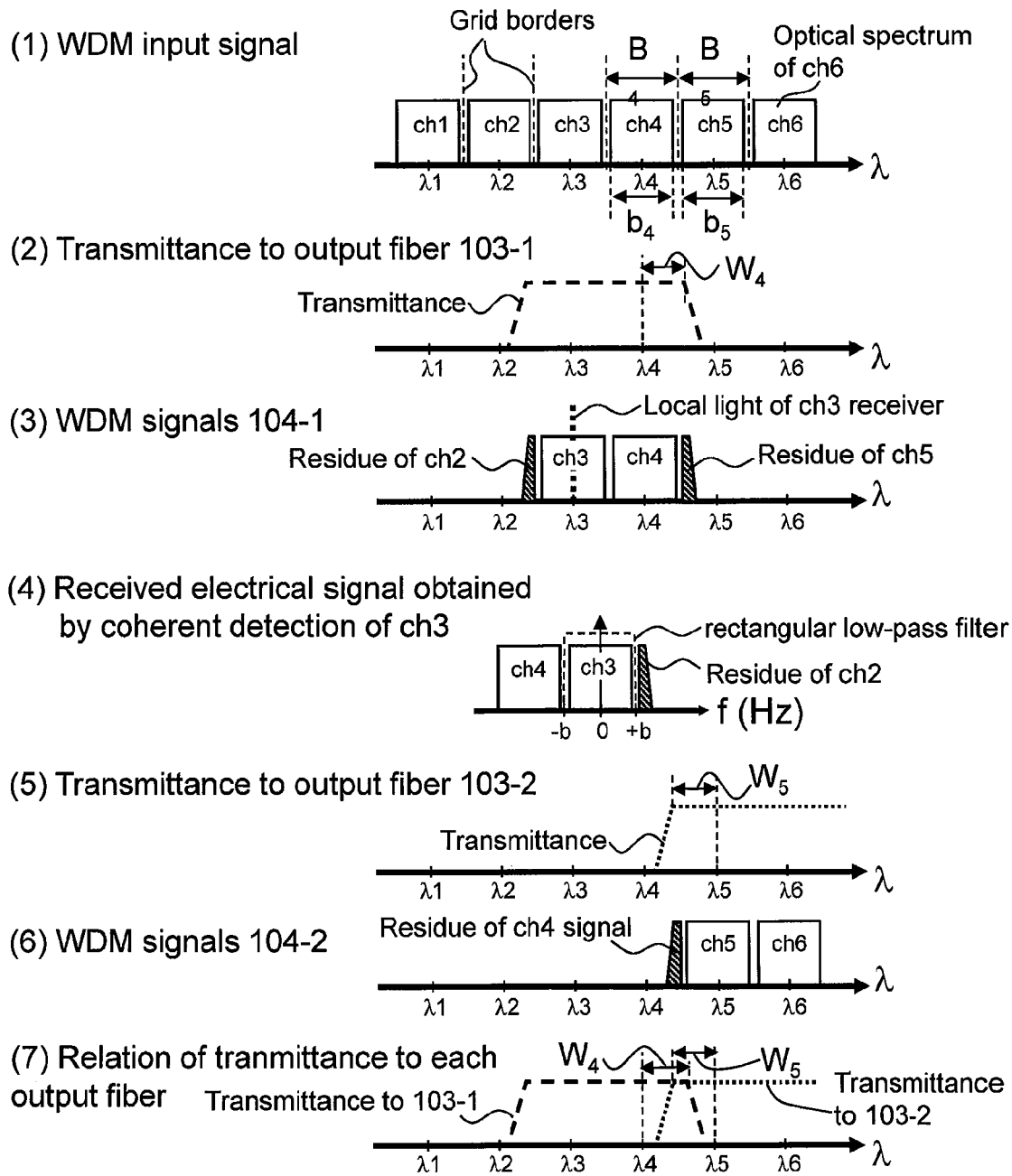
FIG. 6 is a diagram illustrating a wavelength spectrum of an input signal 102-1 and a transmission band of the WSS node 100-1.

In the optical node 106-1, high spectral density optical transmitters 107-1 to 107-6 are arranged. Optical signals of channels 1 to 6 having a signal spectrum close to a rectangle which are output signals of the high spectral density optical transmitters 107-1 to 107-6 are closely subjected to wavelength division multiplexing in an optical coupler 115 so that spacing between adjacent channels is extremely small as illustrated in FIG. 6(1) which will be described later, and then input to the WSS node 100-1 via the input optical fiber line 101 as a WDM input signal 102-1.

The WSS node 100-1 outputs an output WDM signal 104-2 obtained by extracting four wavelength components of the channels 1, 2, 5, and 6 from the WDM input signal 102-1 to an output optical fiber line 103-2. The output WDM signal 104-2 is input to the optical node 106-2 and split into four by an optical splitter 114-1. Coherent optical receiver 109-1, 109-2, 109-3, and 109-4 extract and receive the components of the channels 1, 2, 5, and 6.

The WSS node 100-1 outputs an output WDM signal 104-1 obtained by extracting two wavelength components of the channels 3 and 4 from the WDM input signal 102-1 to the output optical fiber line 103-1. The output WDM signal 104-1 is input to the WSS node 100-2.

The WSS node 100-2 couples the output WDM signal 104-1 with an input signal 102-2 including the component of the channel 2 received from the WSS node 100-3, and outputs an output WDM signal 104-3 obtained by extracting three wavelength components of the channels 2 to 4. The output WDM signal 104-3 is input to the optical node 106-3, and split into three by the optical splitter 114-2. Coherent optical receivers 109-5, 109-6, and 109-7 extract and receive the components of the channels 2 to 4 respectively.

FIG. 6 is a diagram illustrating the wavelength spectrum of the input signal 102-1 and the transmission band of the WSS node 100-1. As illustrated in FIG. 6(1), the input signal 102-1 is closely subjected to wavelength division multiplexing so that wavelength spectrum spacing between adjacent channels is almost zero. Here, for example, "almost zero" represents that spacing between adjacent wavelength spectrums is small so that an inclined portion of a transmission band does not include any channel component.

FIG. 6(2) is a diagram illustrating transmittance of the WSS node 100-1 to the output optical fiber line 103-1 from the input optical fiber line 101. In this transmittance, a transmission width is set to be sufficiently larger than that of the optical transmittance (FIG. 4(2)) of the WSS of the related art, and thus even when signals having spectrum close to a rectangle are arranged to be adjacent to each other, no deficit occurs in the signal spectrums of the channel 3 and the channel 4 which are transmitting signals as illustrated in FIG. 4(3), and no transmitting signal is impaired. Instead, as illustrated in FIG. 6(3), output light include a part of the channel 2 and a part of the channel 5 together as residual light as well as the channel 3 and the channel 4. Since the channels are arranged to be extremely close to the channels 3 and 4, it is difficult to split using wavelength filtering or the like.

In this regard, in the present invention, the optical node 106-3 receives the channel 3 and the channel 4 using a coherent receiver having very high frequency selectivity. In FIG. 6(3), a wavelength arrangement of local light of the coherent receiver receiving the channel 3 is indicated by a dotted line.

The coherent receiver has a function of causing reception light to interfere with local light generated therein and converting an optical field spectrum around local light into an electrical signal in the receiver without change. Thus, a spectrum of a received electrical signal in the receiver is a copy of an optical signal spectrum centering on the channel 3 as illustrated in FIG. 6(4) (a horizontal axis of FIG. 6(4) represents a frequency and is horizontally inversed, but there is no particular influence). In the receiver, complicated digital signal processing can be performed by performing AD conversion on the received signal to be converted into a digital number sequence.

Specifically, it is possible to extract and receive only a signal component of the channel 3 without leakage of residue of the channel 2 or the channel 4 which is an adjacent channel by extracting only a signal of a range of frequency±b of FIG. 6(4) using a high-order digital low pass filter close to a rectangle. Similarly, the channel 4 can be coherently received. Through the above configuration, influence of missing of a signal or mixing of residue can be reduced.

FIG. 6(5) is a diagram illustrating transmittance of the WSS node 100-1 to the output optical fiber line 103-2 from the input optical fiber line 101. In this transmittance, a transmission width is set to be sufficiently larger than the optical transmittance (FIG. 4(4)) of the WSS of the related art so that no deficit occurs in the signal spectrum of the channel 5 as in FIG. 4(4). As a result, in a spectrum of an output signal, residue of the channel 4 occurs at the short wavelength side of the channel 5 as illustrated in FIG. 6(6), but influence thereof can be suppressed by reception using a coherent receiver having high frequency selectivity.

Next, a setting of a transmission band larger than a signal spectrum width and a difference with a configuration of the WSS node 100-1 according to the first embodiment will be described.

Similarly to the one described with reference to FIG. 6 above, in the WSS of the related art is also possible to set a transmission band larger than a desired signal band so that a channel adjacent to a channel which is desired to be transmitted is also output to the same output fiber line. For example, in the example of FIG. 4(2), in order to prevent the channels 3 to 4 to be transmitted from being in deficit, it is likely to be dealt with by changing a setting of transmittance so that wavelengths of the channel 2 and the channel 5 adjacent to the channels are also output to the output optical fiber line 103-1.

However, only by simply extending transmittance to a channel adjacent to a desired channel, wavelength spectrums of the channel 2 and the channel 5 are merely output to the output optical fiber line 103-1 as in a deficit state, but it does not mean that the substantial solution for a channel deficit problem is provided. Thus, in the WSS of the related art, only by simply extending a transmission band, it is unable to receive a signal without impairment, and it is unable to change an output fiber line to another fiber line. In addition to extension of a transmission band, it is necessary to output an optical signal of a channel which is in deficit due to the extension from another path at the same time of a portion corresponding to a deficit.

In view of the above review, the WSS node 100-1 according to the present invention outputs wavelength spectrums of the channel 2 and the channel 5 which are adjacent channels or part thereof to the output optical fiber line 103-1 as illustrated in FIG. 6(3), and freely outputs signals of the channels 2 and 5 to an arbitrary output fiber line without impairment.

It is insufficient to implement the above function only by a transmission bandwidth (twice of W4 in FIG. 6(2)) of the WSS of each channel which is larger than a signal spectrum or grid width (b4 or B4). In addition to that, it is necessary to guarantee that a signal spectrum of each channel can be output to an arbitrary output port together with a part of an adjacent channel in an overlapping manner. To this end, a relation in which transmission bands of adjacent channels overlap as illustrated in FIG. 6(7) is essential. Specifically, a sum of a transmission bandwidth (W4) of the channel 4 at the side from the center wavelength $\lambda 4$ of the channel 4 toward the channel 5 side for the output optical fiber line 103-1 and a transmission bandwidth (W5) at the side from the center wavelength $\lambda 5$ of the channel 5 toward the channel 4 side for the output optical fiber line 103-2 needs to be larger than spacing ($\lambda 5 - \lambda 4$) between $\lambda 4$ and $\lambda 5$, that is, needs to satisfy $W4+W5>\lambda 5-\lambda 4$.

A relation between adjacent transmission bands described above with reference to FIG. 6 is a DWDM signal in which WDM signals to be multiplexed or demultiplexed are arranged such that spacing between adjacent channels is extremely small as illustrated in FIGS. 1(3) to 1(5) as well as a WDM signal illustrated in FIG. 6(1), and it is effective even when it is difficult to split in the normal WSS.

First Embodiment

Conclusion

As described above, the WSS node 100-1 according to the first embodiment is configured to cause flat portions of adjacent transmission bands on a wavelength spectrum to overlap. Further, the output WDM signal 104-1 includes the optical signal of the channel 4 and the residue of the channel 5 together, and the output WDM signal 104-2 includes the optical signal of the channel 5 and the residue of the channel 4 together. In other words, the WSS node 100-1 can not only extend a transmission band to include an adjacent channel but also output portions in which transmission bands overlap to respective output destinations at the same time. Thus, it is possible to switch high-density WDM signals without any deficit.

In the first embodiment, the DWDM is generated by multiplexing the optical signals of the channels 1 to 6 individually output from the high spectral density optical transmitters 107-1 to 6 by the optical coupler 115 having no wavelength selectivity. Further, when an optical signal is split, a copy of the optical signal is generated using the optical splitter 114-1 or 114-2 having no wavelength selectivity, and a desired optical channel is extracted and received using the coherent optical receivers 109-1 to 109-7. The wavelength multiplexing and wavelength demultiplexing schemes are independent of the concept or configuration of the WSS node of the present invention, and thus an appropriate configuration may be provided as necessary. For example, a plurality of light sources may be arranged in a single high spectral density optical transmitter, and a broad band multicarrier optical multilevel transmitter that collectively outputs DWDMs such as the channels 1 to 6 may be used. Further, each receiver may have an appropriate configuration of collectively receiving the channels as independent individual wavelength channels or a multicarrier signal obtained by tying a plurality of wavelengths. The same applies in the following embodiments.

As will be described in the following embodiments, all optical signals passing through the WSS node 100-1 need not be the above-described DWDM signal, and some or most of the optical signals may be WDM signals of the related art having a sufficient gap between signal spectrums. The wavelength splitting scheme of the present invention may be applied only to a portion in which channel spacing is so small that it is difficult to split in the WSS of the related art.

Further, FIG. 5 is a schematic layout diagram of the optical nodes, and illustrates only the functions of the optical nodes which are optical transmission devices. For example, the devices may be arranged in the housing of the same device as necessary or may be arranged in a network node, a station, a building, or the like at a distance of several tens of kilometers or several thousands of kilometers. Although not illustrated in FIG. 5, when long-distance transmission is implemented, a plurality of optical amplifying relays or the like are generally arranged in the middle of an optical fiber line, and even when an optical transmission device having the optical amplifying relays or other functions are added as necessary, there is no influence on the effects of the present invention.

Second Embodiment

Figure 7:
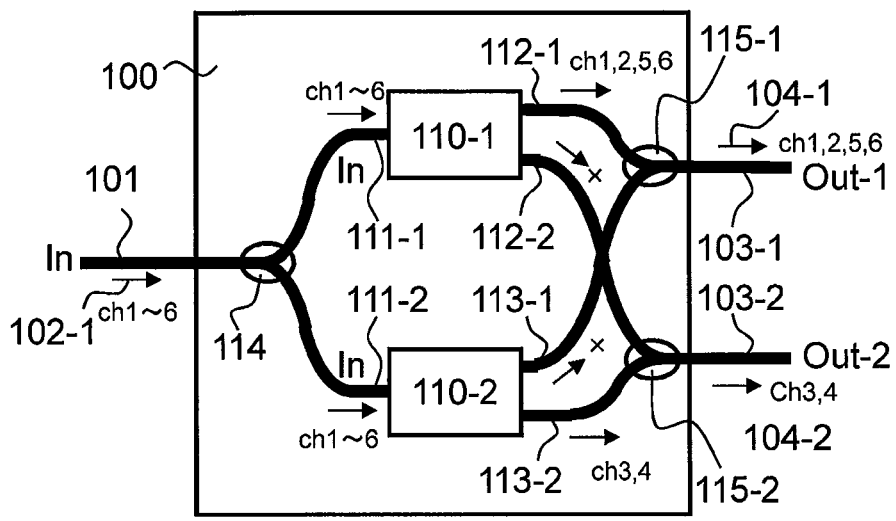
FIG. 7 is a configuration diagram illustrating a WSS node 100 according to a second embodiment.

FIG. 7 is a configuration diagram illustrating a WSS node 100 of a second embodiment of the present invention. FIG. 7 corresponds to a concrete configuration example of the WSS node 100-1 described in the first embodiment.

The WSS node 100 has a 1:2 configuration of arbitrarily distributing and outputting an input signal 102-1 input from a single input optical fiber line 101 to output optical fiber lines 103-1 and 103-2. In the WSS node 100, two WSS 110-1 and 110-2 are arranged, and the function of the WSS node 100 is implemented by a collaboration of both WSSs.

The input signal 102-1 is split into two by an optical splitter 114 and input to input ports 111-1 and 111-2 of the WSSs 110-1 and 110-2.

Both of the WSSs 110-1 and 110-2 have a 1:2 configuration. An output port 112-1 of the WSS 110-1 is coupled with an output port 113-1 of the WSS 110-2 by an optical coupler 115-1, and outputs thereof are added and output to an output optical fiber line 103-1. An output port 112-2 of the WSS 110-1 is coupled with an output port 113-2 of the WSS 110-2 by an optical coupler 115-2, and outputs thereof are added and output to an output optical fiber line 103-2.

In the second embodiment, by alternately using the two WSSs 110-1 and 110-2 in order from the channel 1, a characteristic in which transmittances to output optical fiber lines overlap as in FIG. 6(7) is obtained. Specifically, the WSS 110-1 deals with the channels 1 and 2, the WSS 110-2 deals with the channels 3 and 4, and the WSS 110-1 deals with the channels 5 and 6 again. The reason why the WSSs are alternately allocated will be described later with reference FIG. 8 which will be described later.

Figure 8:
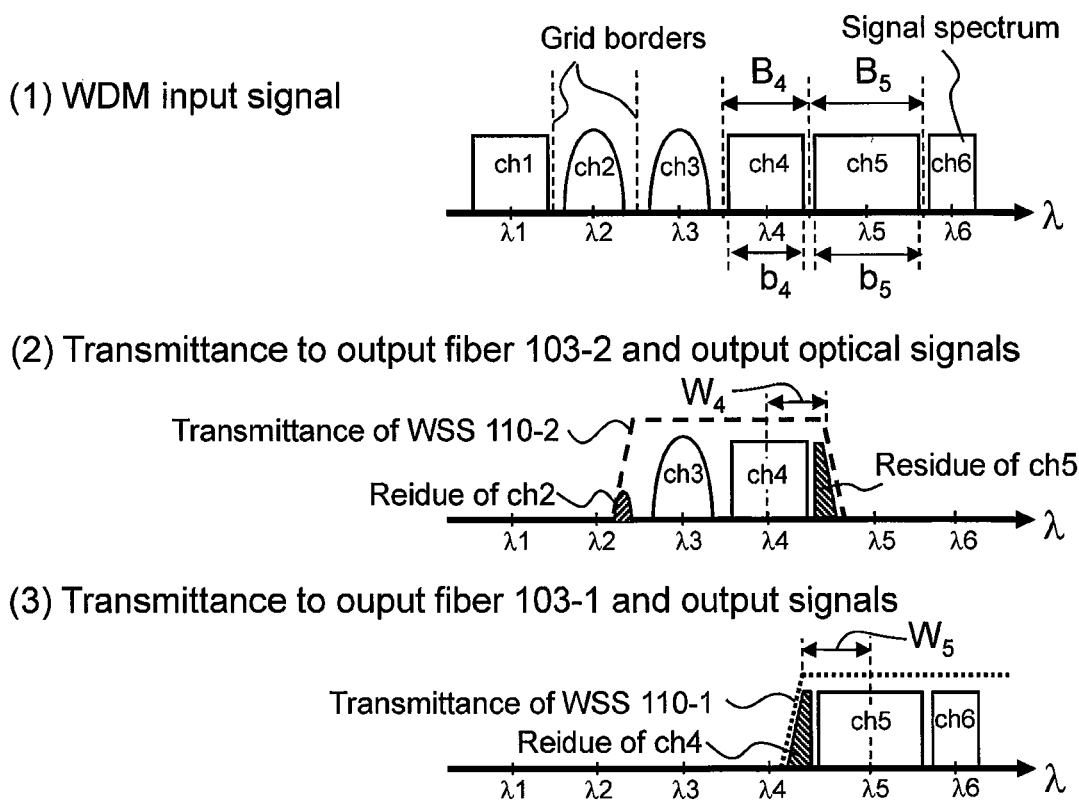
FIG. 8 is a diagram illustrating a relation between an optical signal and a transmission band of the WSS node 100 according to the second embodiment.

FIG. 8 is a diagram illustrating a relation between an optical signal and a transmission band of the WSS node 100 according to the second embodiment. FIG. 8(1) illustrates an example of the wavelength spectrum of the WDM input signal 102-1. In this example, among 6 signal channels, the channels 2 and 3 are optical signals of the related art that does not use spectral narrowing and high-density channel allocation, and the channel 6 is an optical signal having a spectral narrowing to which the present invention is applied but is narrower in spectrum width than the other wavelengths (the channels 1, 4, and 5). The WSS node 100 has a transmission bandwidth larger than a frequency selecting switch of a related art, and thus can be used even when an optical signal of a related art is mixed with an optical signal multiplexed with a high density.

In FIG. 8(2), first, the WSS 110-2 outputs the optical signals of the channels 3 and 4 to the output port 113-2, and at the same time, the WSS 110-1 interrupts an output of the same wavelength band (a range of wavelengths $\lambda 2$ to $\lambda 5$ in this example) to the output port 112-2. In FIG. 8(2), a dotted line represents transmittance of the WSS 110-2 to the output port 113-2. By setting a transmission bandwidth to be larger than each channel band, it is possible to extract the optical signals of the channels 3 and 4 without any deficit.

The output light beams of both switches are added by the optical coupler 115-2 and then output to the output optical fiber line 103-2, but since the output light of the WSS 110-1 in the wavelength range of $\lambda 2$ to $\lambda 5$ is interrupted, the optical signals of the channels 3 and 4 illustrated in FIG. 8(2) output from the WSS 110-2 are output as the output WDM signal 104-2 without change.

Further, the output WDM signal 104-2 includes the residue of the channel 5 and the residue of the channel 2, but only a desired channel may be extracted by electrically removing the residue using the coherent receiver similarly to the first embodiment or removing the residue using the WSS of the related art or the narrow band filter, or the like again.

Further, for a channel arranged biased to one end of the transmission band such as the channel 3 illustrated in FIG. 8(2), when spacing between adjacent spectrums is sufficiently large, the transmission bandwidth at the side at which the channel 3 is arranged may be set to about the same width as the transmission bandwidth of the WSS of the related art, and the channel 3 may be output without residue since spacing between adjacent channels is sufficiently large.

When the channel 1, 2, 5, and 6 are output to the output optical fiber line 103-1, the other WSS 110-1 is used. FIG. 8(3) illustrates a portion related to the channels 5 and 6 in the transmittance of the WSS 110-1 and the signal spectrum. A description of the channels 1 and 2 is omitted, but an action thereof is the same.

In the WSS 110-1, a transmission band to the output port 112-1 is set to be sufficiently large so that the signal spectrums of the channels 5 and 6 are not in deficit. Meanwhile, the WSS 110-2 blocks the output signal to the output port 113-2 in the same wavelength band (a long wavelength side from a wavelength $\lambda 4$ in this example). As a result, the output WDM signal 104-1 including the channels 5 and the channel 6 (and the channels 1 and 2) is output to the output optical fiber line 103-1. Influence of the residue of the channel 4 illustrated in FIG. 8(3) can be removed, similarly to the case of FIG. 8(2).

The reason why the WSSs dealing with the channel are alternately allocated in order from the channel 1 is to output a channel in which a deficit has occurred due to an inclined portion of a transmission band from another output optical fiber line. For example, in FIG. 8(2), an output of the WSS 110-2 is in a state in which the channel 5 is in deficit. In order to make up for it, the other WSS 110-1 needs to output the channel 5 within the transmission band without deficit.

Second Embodiment

Conclusion

As described above, in the WSS node 100 according to the second embodiment, the WSS 110-1 outputs a transmission band at a short (or long) wavelength side, and the WSS 110-2 outputs a transmission band at a long (or short) wavelength side. As the WSS nodes alternately deal with the channels, it is possible to set wide transmission bands which overlap each other to the two output optical fiber lines at the same time and prevent a deficit of a signal spectrum as described in the first embodiment. The internal configuration of the WSS node 100 is an example for implementing the basic concept of the present invention, and does not deny implementation of the same function by any other configuration.

Third Embodiment

Figure 9:
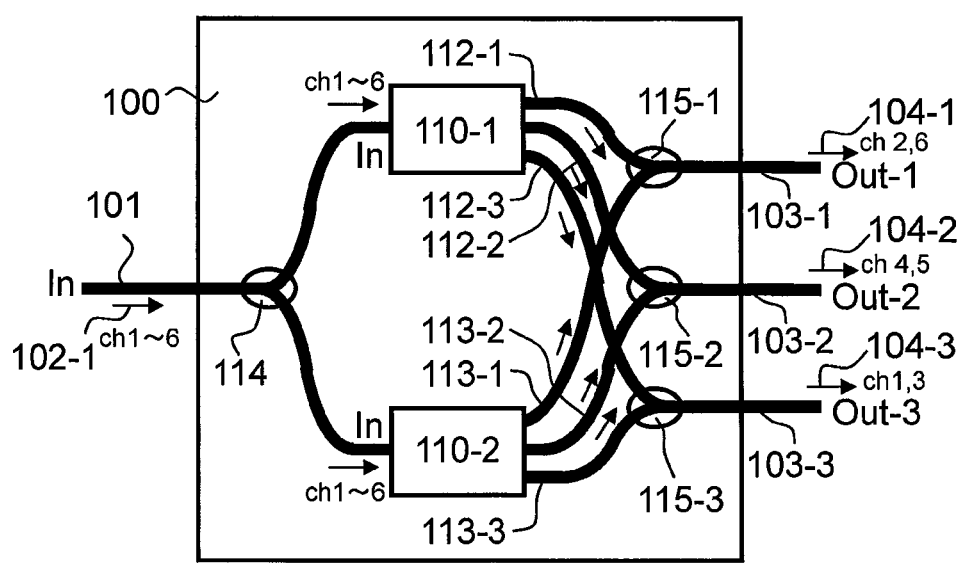
FIG. 9 is a configuration diagram illustrating a WSS node 100 according to a third embodiment.

FIG. 9 is a configuration diagram illustrating a WSS node 100 according to a third embodiment of the present invention. The WSS node 100 according to the third embodiment has a 1:3 configuration of outputting an arbitrary optical signal to three output fiber lines 103-1, 103-2, and 103-3 using two WSSs 110-1 and 110-2.

The WSSs 110-1 and 110-2 are a WSS having a 1:3 configuration. Output ports of both switches are coupled by optical couplers 115-1, 115-2, and 115-3 by two, and then output to the three output optical fiber lines 103-1, 103-2, and 103-3. The optical signals of the channels 1 to 6 are input to the input optical fiber line 101, and the wavelength channels 2 and 6, 4 and 5, and 1 and 3 are output to the output optical fiber lines 103-1, 103-2, and 103-3.

Figure 10:
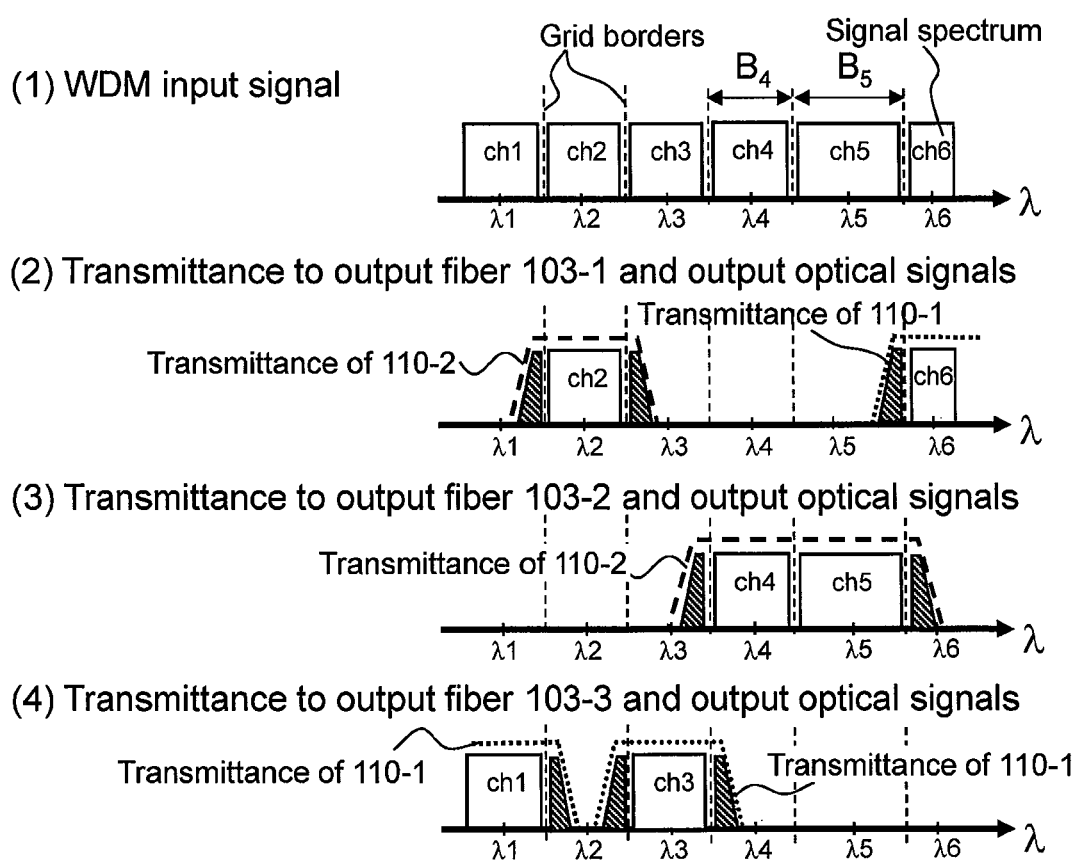
FIG. 10 is a diagram illustrating a relation between an optical signal spectrum and a transmission band of the WSS node 100 according to the third embodiment.

FIG. 10 is a diagram illustrating a relation between an optical signal spectrum and a transmission band of the WSS node 100 according to the third embodiment. In the third embodiment, there are several methods of implementing the function of the present invention, but the following description will proceed with an example in which when optical signals of a plurality of channels whose wavelength bands are consecutive are output to a single output fiber line, the two WSSs 110-1 and 110-2 are alternately used from the short wavelength side. The reason why the WSSs are alternately allocated is the same as the reason described in the second embodiment.

First, the WSS 110-1 outputs the channel 1 of the shortest wavelength to the output port 112-3, and the WSS 110-2 interrupts an output of the same wavelength band to the output port 113-3. As a result, the channel 1 is output to the output optical fiber line 103-3 as illustrated in FIG. 10(4).

Then, the WSS 110-2 outputs the channel 2 at the short wavelength side and transmits the channel 2 to the output port 113-1. The WSS 110-1 interrupts the output of the same wavelength band to the output port 112-1. As a result, the optical signal of the channel 2 is output to the output optical fiber line 103-1 as illustrated in FIG. 10(2).

Then, similarly, outputting of the channel 3 is undertaken by the WSS 110-1 again, and outputting of the channels 4 and 5 are undertaken by the WSS 110-2. As described above, as the channels are output using the different optical switches alternately in order from the short wavelength side, it is possible to split and output desired optical signals to the three output optical fiber lines 103-1, 103-2, and 103-3 without spectrum deficit as illustrated in FIGS. 10(2), 10(3), and 10(4).

The present embodiment has been described in connection with the 1:3 configuration, but it is possible to easily extend the configuration described in the third embodiment to an 1:N output using WSSs having an 1:N configuration as the internal WSSs 110-1 and 110-2 and N 2:1 optical couplers 115-1 to N.

Fourth Embodiment

One of problems of the WSS node 100 described in the third embodiment lies in that when a switching path is changed, that is, when an output optical fiber line serving as an output destination of an optical signal of a certain channel is changed to another output optical fiber line, switching (blocking) is performed on another channel unrelated to switching.

Figure 11:
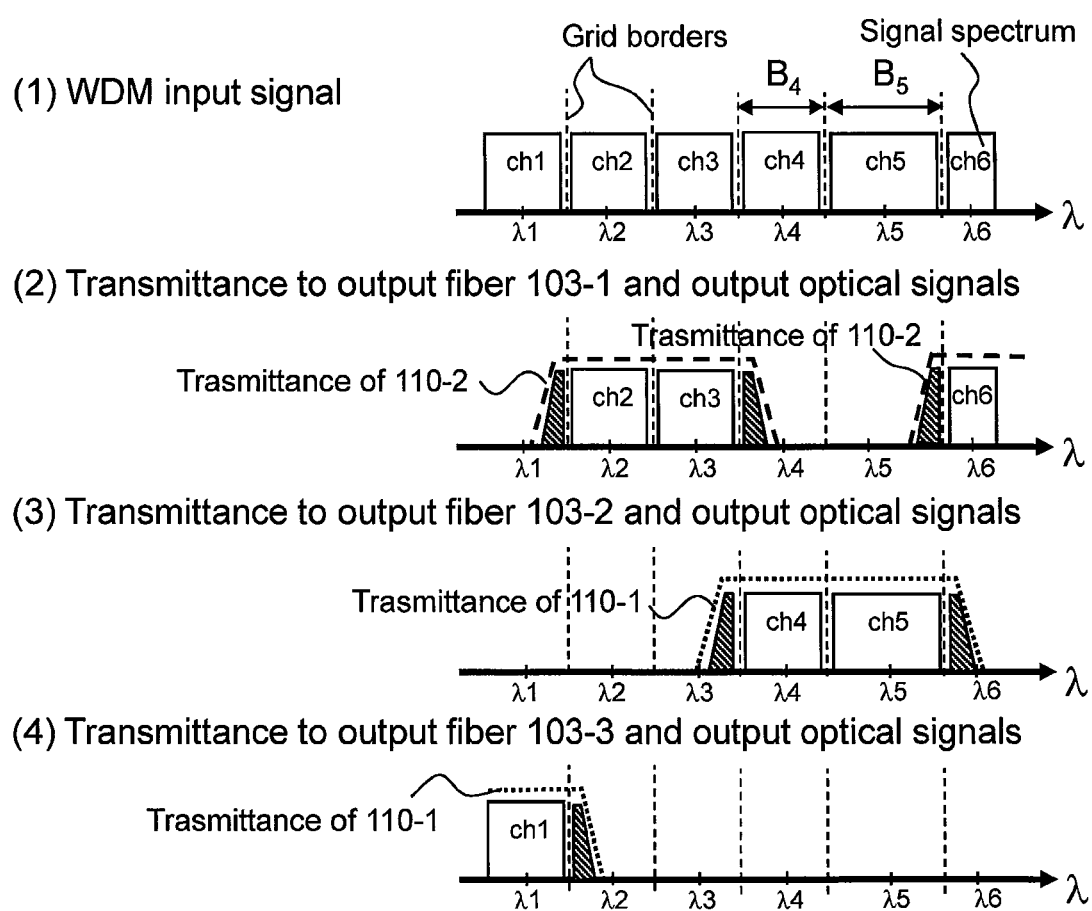
FIG. 11 is a diagram illustrating a relation between an optical signal spectrum and a transmission band of the WSS node 100 after an output destination port of a channel 3 is changed in the third embodiment.

FIG. 11 is a diagram illustrating a relation between an optical signal spectrum and a transmission band of the WSS node 100 after an output destination port of the channel 3 is changed in the third embodiment. In FIG. 11, the state of FIGS. 9 and 10 in which the optical signal of the channel 3 is output to the output optical fiber line 103-3 is changed to the state in which the optical signal of the channel 3 is output to the output optical fiber line 103-1.

In the state of FIG. 10, when the output destination of the channel 3 is changed from the output optical fiber line 103-3 to the output optical fiber line 103-1, from a point of view of channel consecutiveness, the WSS 110-2 deals with the adjacent channels 2 and 3, and transmits the channels to the output optical fiber line 103-1 at the same time. This example is illustrated in FIG. 11(2).

As a result of dealing with the channel 3 through the WSS 110-2, the channel 4 is in deficit in the output of the WSS 110-2. For this reason, the channel 4 needs to be dealt with by the WSS 110-1. The same applies to the adjacent channel 5. Thus, since the channel 6 is in deficit in the output of the WSS 110-1, the channel 6 needs to be dealt with by the WSS 110-2.

As a result, the WSS dealing with the channels 4 to 6 need to be changed before the output destination of the channel 3 is changed. When such changing is performed, instantaneous interruption or interference occurs in the optical signals of the channels 4 to 6 in the switch change transient state, and a line quality is remarkably impaired. The fourth embodiment of the present invention will be described in connection with a configuration example of preventing an instantaneous signal interruption or interference that is caused due to the output destination change.

Figure 12:
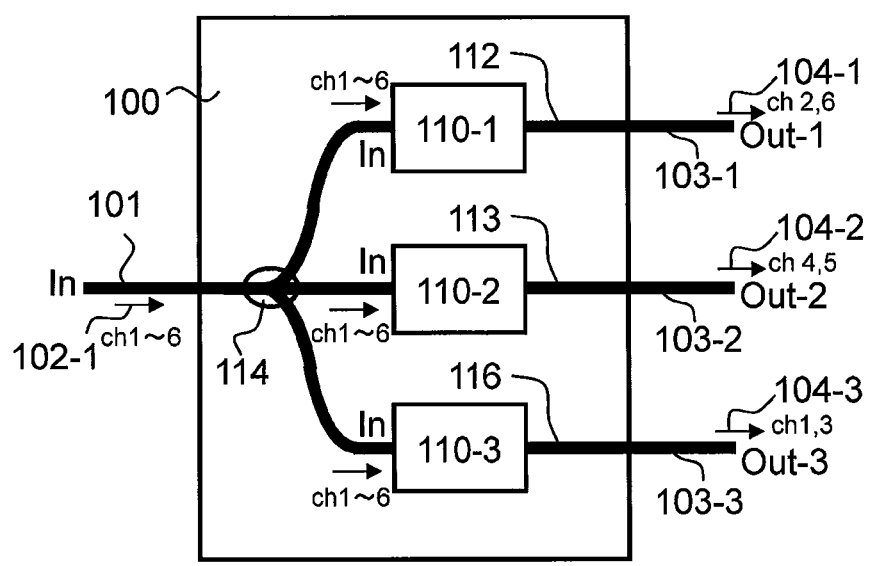
FIG. 12 is a configuration diagram illustrating a WSS node 100 according to a fourth embodiment.

FIG. 12 is a configuration diagram illustrating the WSS node 100 according to the fourth embodiment. The WSS node 100 according to the fourth embodiment includes three 1:1 WSSs 110-1, 110-2, and 110-3. The optical splitter 114 splits an input signal 102-1 into three, and inputs the split signals to the WSSs 110-1, 110-2, and 110-3. The output ports 112, 113, and 116 are coupled directly to three output optical fiber lines 103-1, 103-2, and 103-3. The WSSs 110-1, 110-2, and 110-3 undertakes outputting of optical signals of the different output optical fiber lines 103-1, 103-2, and 103-3.

Figure 13:
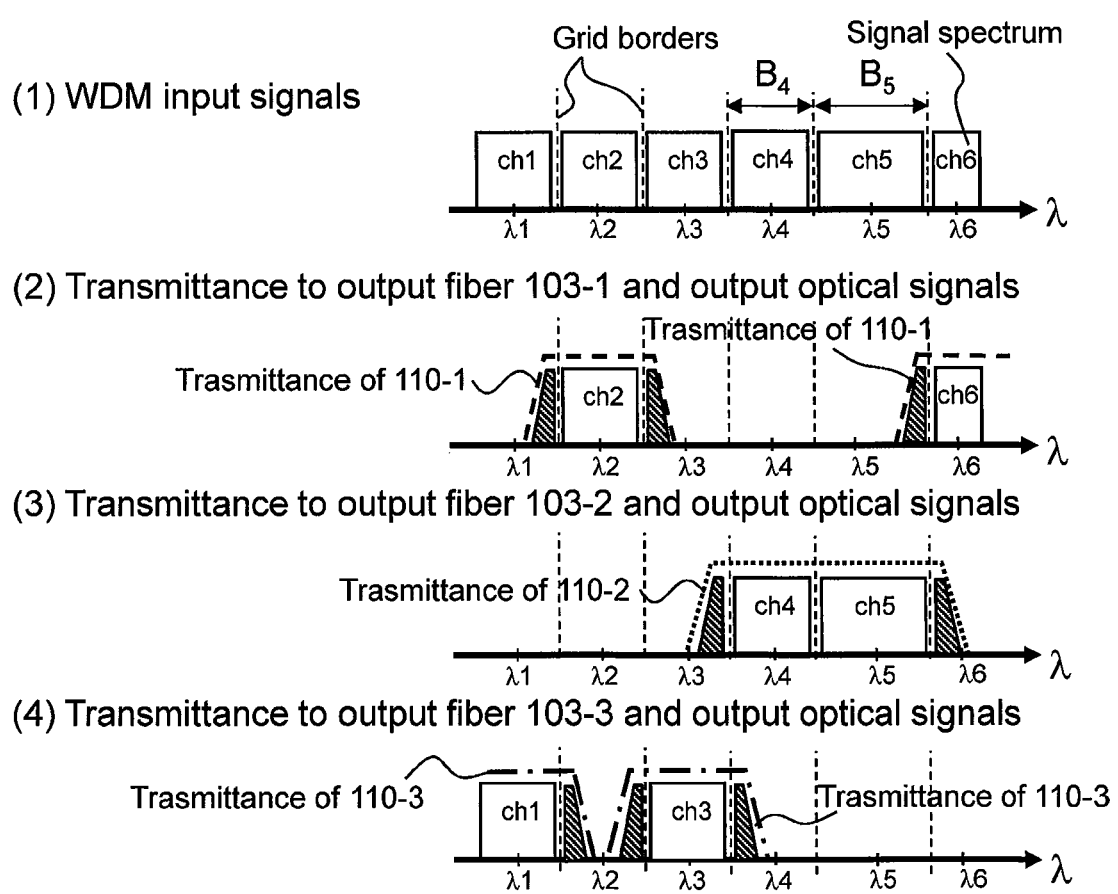
FIG. 13 is a diagram illustrating a relation between an optical signal spectrum and a transmission band of a WSS node 100 according to a fourth embodiment.

FIG. 13 is a diagram illustrating a relation between an optical signal spectrum and a transmission band of the WSS node 100 according to the fourth embodiment. Among the input optical signals of the channels 1 to 6, the channels 2 and 6 are output to the output optical fiber line 103-1, the channels 4 and 5 are output to the output optical fiber line 103-2, and the channels 1 and 3 are output to the output optical fiber line 103-3.

Each WSS undertakes outputting of a channel to be output to an output optical fiber line connected thereto. This example is illustrated in FIGS. 13(2) to 13(4). For example, a transmission band larger than the signal channels 4 and 5 is set to the WSS 110-2, and the WSS 110-2 outputs the channels to the output optical fiber line 103-2. As a result, it is possible to output the channels 4 to 5 without deficit.

According to the configuration illustrated in FIG. 13, since different WSSs output the wavelength to different output optical fiber lines, it is possible to prevent a deficit of a signal spectrum even when DWDM signals are split while causing transmission bands to overlap. Further, since a single WSS is provided for each output optical fiber line, even when a channel output destination is changed; it is possible to prevent the occurrence of instantaneous interruption of a channel or interference.

FIG. 13 illustrates an example in which only the channel 6 is a band-constricted optical signal whose signal spectrum width or wavelength grid width is narrow, but by changing a selection wavelength width for each optical signal to be output, it is possible to split even such an optical signal without any problem.

Fifth Embodiment

A fifth embodiment of the present invention will be described in connection with a method of implementing a WSS according to the present invention using the WSS of the related art.

The WSS according to the present invention needs to split a selected optical signal to be sufficiently larger than an allocation band (or grid) of each optical signal. On the other hand, since the WSS of the related art outputs a wavelength band including the channel 2 using a grid border as a border line when a designated optical signal (for example, the channel 2) is output, a transmission band is narrow, and thus it is difficult to use the WSS of the related art as the WSS according to the present invention without change.

FIG. 14 is a diagram illustrating a relation between an optical signal spectrum and the transmission band of the WSS node of the related art. FIG. 14 illustrates an example in which the WSS 110-1 described above with reference to FIG. 13 in the fourth embodiment is implemented using the WSS of the related art whose a wavelength grid width is the same as an allocation band of an optical signal.

Preferably, the WSS 110-1 switches adjacent channels (the channels 1 and 3 adjacent to the channel 2 and the channel 5 adjacent to the channel 6) at both sides of an output target channel (in FIG. 14, the channels 2 and 6) to the same port as the output target channel. As a result, the channels 1, 3, and 5 are output to the output optical fiber line 103-1 without change as the residue, but no spectrum deficit occurs in the optical signals of the channels 2 and 6 which are the output target channel. Similarly, when the channel 2 and the channel 4 are output, it is desirable to transmit all the channels 1, 2, 3, 4, and 5 at the same time.

However, in the above example, since an adjacent channel occupies a band with little change as the residue when a channel is output, the efficiency of spectral usage of the output optical fiber line significantly decreases, and an output of an optical amplifier is useless. In addition, there are many piratical problems, for example, excessive crosstalk from an adjacent channel is likely to occur.

Figure 15:
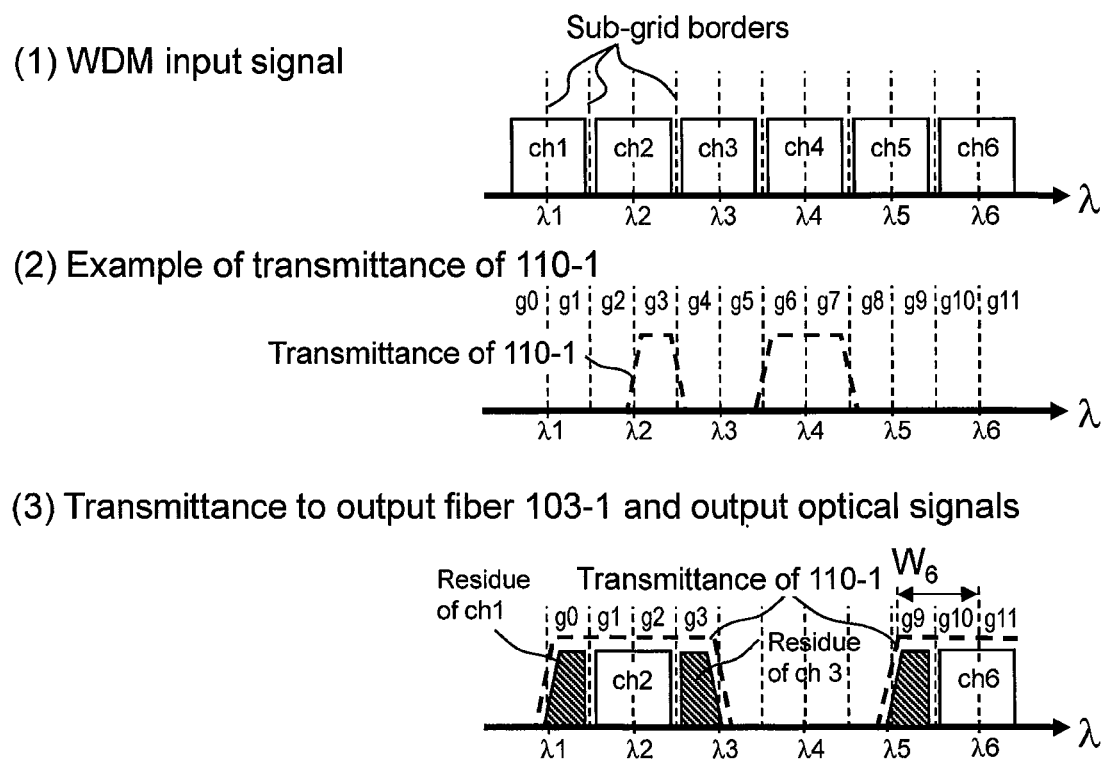
FIG. 15 illustrates an example using a WSS of a related art in which a sub grid border is identical to a center wavelength of a signal channel.
Figure 16:
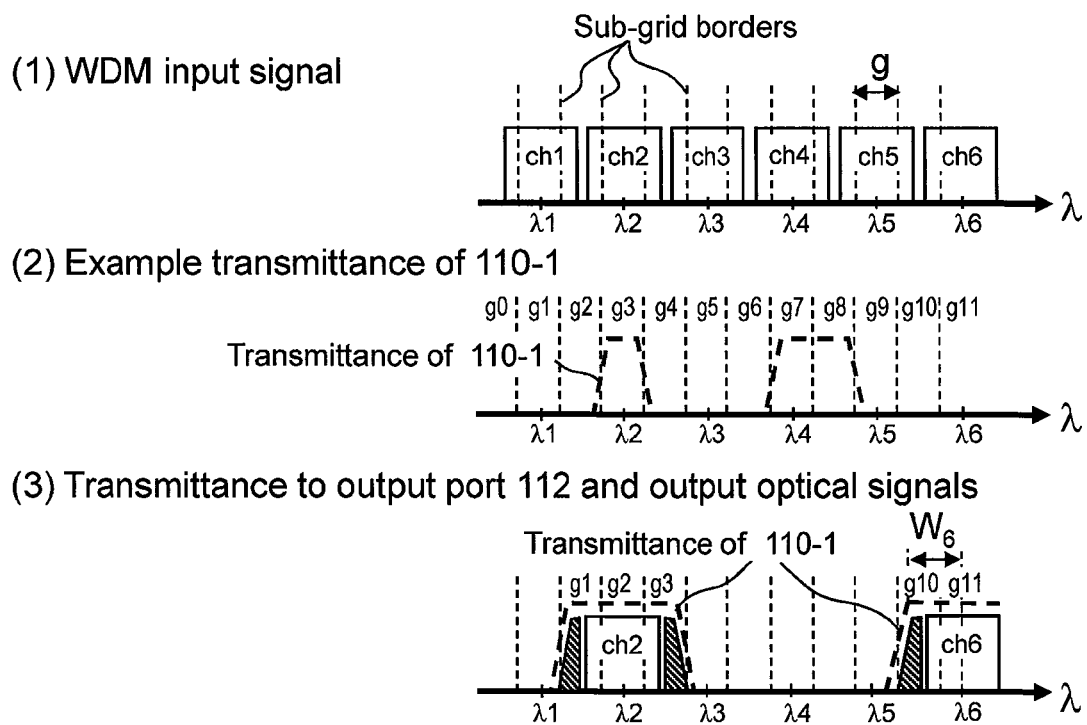
FIG. 16 illustrates an example in which a sub grid border is not identical to a center wavelength of a signal channel, and a channel straddles three wavelength grids.

In this regard, in the fifth embodiment, the function of the WSS 110-1 of the present invention is implemented using the WSS of the related art having a narrow wavelength change unit as illustrated in FIGS. 15 and 16. In FIGS. 15 and 16, a WSS is assumed to be able to change a channel in units of sub grids having a ½ width of a channel allocation band.

FIG. 15 illustrates an example using the WSS of the related art in which a sub grid border is identical to a center wavelength of a signal channel. FIG. 15(2) illustrates a transmission band setting example. For example, when a transmission band is set so that sub grids g3, g6, and g7 can be transmitted to an output optical fiber line, a transmission band in which an optical signal of approximately a right half portion of the channel 2 at the long wavelength side and most of the channel 4 transmit is obtained. Using the WSS of the related art having the narrow wavelength change unit, it is possible to significantly improve the efficiency of spectral usage of the WSS node 110-1, compared to the case of FIG. 14.

FIG. 15(3) illustrates an example in which the channels 2 and 6 are output to the output optical fiber line 103-1. Specifically, it is desirable to change the transmission band of the WSS so that the sub grids g0, g1, g2, g3, g9, g10, and g11 are transmitted to the output optical fiber line 103-1. As a result, it is possible to sufficiently increase the transmission bandwidth of the WSS 110-1 so that the optical signals of the channels 2 and 6 are not in deficit.

In the configuration of the transmission band illustrated in FIG. 15, when the channel 2 is output to the output optical fiber line 103-1, it is necessary to output even optical signals on the sub grids g0 and g3 partially including the adjacent channels 1 and 3 to the output optical fiber line 103-1. Compared to the example in which the adjacent channels 1 and 3 are simultaneously output with little change as illustrated in FIG. 14, since channels to be simultaneously output are within a range of a sub grid or less in FIG. 15, a wavelength band occupied by residue or intensity thereof is about ½ of that of FIG. 14, and the efficiency of spectral usage can be improved by that portion.

FIG. 16 illustrates an example in which a sub grid border is not identical to a center wavelength of a signal channel, and a channel straddles three wavelength grids. In FIG. 16, for example, when the channels 2 and 6 are output to the output optical fiber line 103-1, it is desirable to change the transmission band of the WSS 110-1 so that a sub grid including a center wavelength and sub grids at both sides thereof are transmitted to the output optical fiber line 103-1.

When the channel 2 is extracted, it is desirable to transmit optical signals on not only a sub grid including a spectrum component of a channel to be extracted but also sub grids including spectrum components of adjacent channels at both sides thereof. Specifically, it is desirable to set not only sub grids g2 and g11 including only an optical signal to be extracted but also sub grids g1 and g3 and sub grids g10 and g12 including both adjacent channels at both sides thereof and an optical signal to be extracted to a transmission state.

According to the configuration illustrated in FIG. 16, a transmission band which is less than 1.5 times as large as a signal allocation band in each channel is obtained, and a deficit of a signal spectrum can be prevented. As described above, in this example, compared to FIGS. 14 and 15, it is possible to further improve the efficiency of spectral usage and reduce a quantity of residue.

Further, as described above with reference to FIGS. 15 and 16, the WSS of the related art that selects a wavelength for each sub grid is not limited to the WSS node described in the fourth embodiment, and may be used to configure the WSS node described in any other embodiment.

Fifth Embodiment

Conclusion

As described above, according to the fifth embodiment, an effect of easily configuring the WSS nodes described in the first to fourth embodiments at a low cost using the existing WSS and thus increasing practicability is obtained.

Sixth Embodiment

Figure 17:
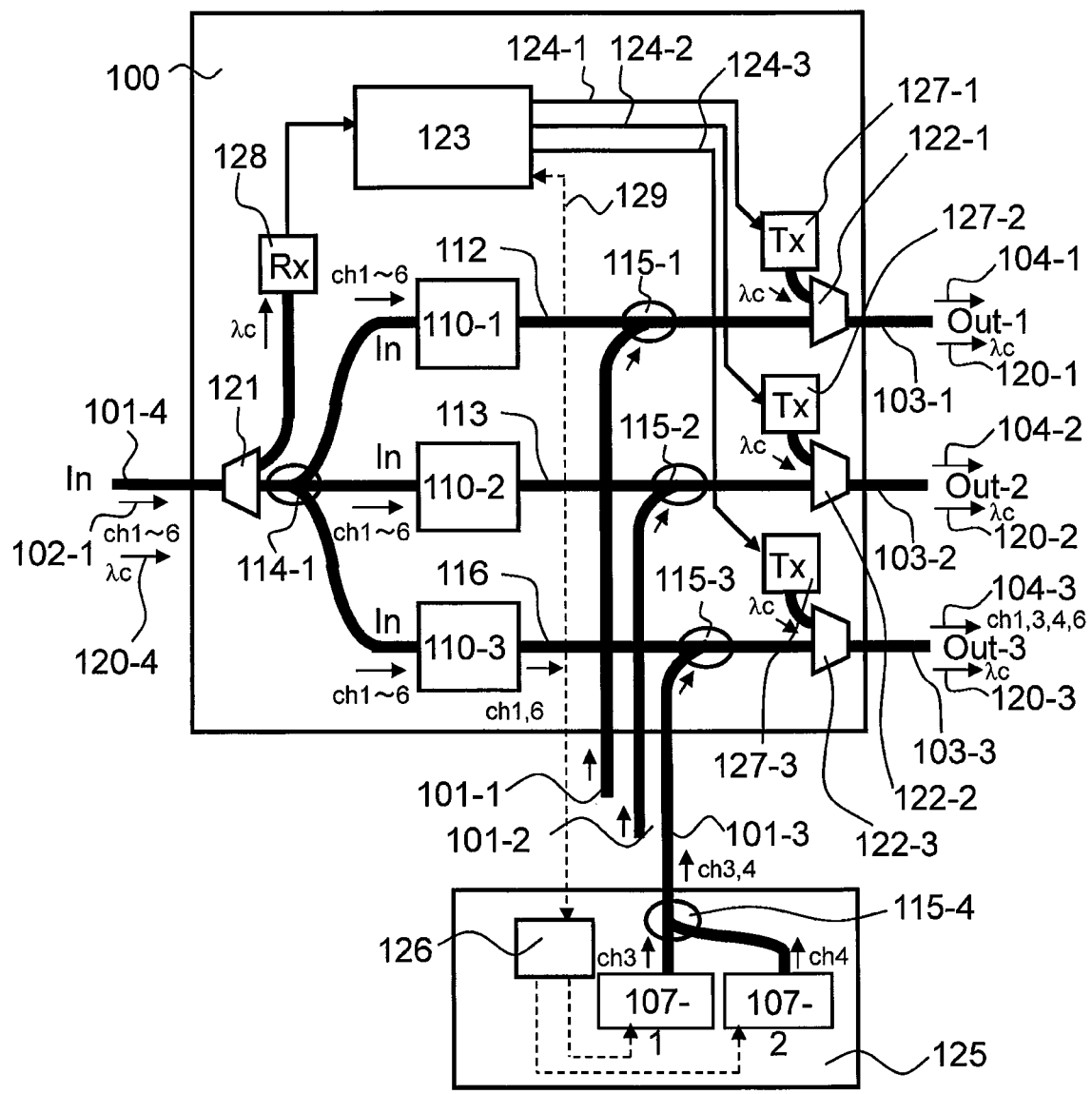
FIG. 17 is a configuration diagram illustrating a WSS node 100 according to a sixth embodiment.

FIG. 17 is a configuration diagram illustrating a WSS node 100 according to a sixth embodiment of the present invention. The WSS node 100 according to the sixth embodiment manages a wavelength band using monitoring light 120.

The WSS node 100 has a 1:3 configuration of distributing an input signal 102-1 input to a single input optical fiber line 101-4 to three output optical fiber line 103-1, 103-2, and 103-3. A main configuration of the WSS node 100 is the same as one described in the fourth embodiment, and wavelength selection is performed by appropriately changing three WSSs 110-1, 110-2, and 110-3 connected to the respective output optical fiber lines.

Monitoring light 120-4 transmitted from an upward device is transmitted to the input optical fiber line 101-4. Monitoring light 120-3 is split by a monitoring light wavelength demultiplexing circuit 121 and received by a monitoring optical receiver 128. A monitoring light information processing circuit 123 receives the monitoring signal received by the monitoring optical receiver 128, and performs a wavelength management process which will be described later, in addition to normal monitoring information processing. Specifically, signal wavelengths extracted in units of wavelength lines, an added signal wavelength, information on the presence or absence of residue, and the like are updated and then output as monitoring information 124-1, 124-2, and 124-3. The monitoring information is converted into monitoring light by monitoring light transmitters 127-1, 127-2, and 127-3, wavelength-multiplexed into output WDM signals 104-1, 104-2, and 104-3 by monitoring light wavelength multiplexing circuits 122-1, 122-2, and 122-3, then output to the three output optical fiber lines 103-1, 103-2, and 103-3, and transmitted to a downward optical transmission device.

The WSS node 100 further has a configuration of adding a WDM signal output from a transponder accommodating device 125 arranged nearby the WSS node 100 through an optical coupler 115-3. The transponder accommodating device 125 will be described later.

FIG. 18 is a diagram illustrating a relation between an optical signal spectrum and a transmission band of the WSS node 100 according to the sixth embodiment. FIG. 18 illustrates an example in which the transponder accommodating device 125 adds channels 3 and 4.

FIG. 18(1) illustrates a signal spectrum of the input signal 102-1. The WSS node 100 divides the input signal 102-1 into 3 through an optical splitter 114-1, and one of the three signals is input to the WSS 110-3. The WSS 110-3 selects and transmits optical signals of channels 1 and 6 as illustrated in FIG. 18(2).

Two high spectral density optical transmitters 107-1 and 107-2 are arranged in the transponder accommodating device 125. The high spectral density optical transmitters 107-1 and 107-2 output optical signals of the channel 3 (wavelength λ3) and the channel 4 (wavelength λ4), respectively. By adding both optical signals through the optical coupler 115-4, it is possible to perform multiplexing both optical signals closely with little wavelength gap. The multiplexed optical signals of the channels 3 and 4 are input to the WSS node 100 via the input optical fiber line 101-3.

The optical coupler 115-3 adds the signals of the channels 3 and 4 to the signals of the channels 1 and 6 obtained from tan output port 116. As a result, a new WDM signal obtained by multiplexing the channels 1, 3, 4, and 6 is obtained as illustrated in FIG. 18(3).

In FIG. 17, a path of an optical signal (drop light) from the WSS node 100 to the transponder accommodating device 125 is not illustrated, but for example, a wavelength add drop configuration of outputting an arbitrary wavelength in the transponder accommodating device 125 and adding an optical signal of an arbitrary wavelength can be implemented such that the output fiber line 103-1 is connected to the optical receiver of the transponder accommodating device 125.

In the configuration illustrated in FIG. 17, a connection of add light is limited to the input optical fiber line 101-3, but an optical fiber line from another transponder accommodating device or optical WSS node may be connected to the other input optical fiber lines 101-1 and 101-2. Further, the WSS node having the 1:3 configuration may be arranged in the middle of the transponder accommodating device 125 and the input optical fiber lines 101-1, 101-2, and 101-3, and add light may be arbitrarily distributed to any one of the input optical fiber lines 101-1, 101-2, and 101-3 for each wavelength.

The configuration of the WSS node 100 according to the sixth embodiment has been described above. Next, the monitoring light 120 will be described.

The monitoring light 120-1 to 120-4 of another wavelength other than WDM signal light are wavelength-multiplexed and transmitted to the input optical fiber line 101-4 and the output optical fiber lines 103-1, 103-2, and 103-3. The monitoring light 120120-1 to 120-4 undertake transmission of control information between devices. Examples of the control information include state monitoring information such as a laser current or a device temperature in an upward device, a warning or failure signal such as a signal interruption or a device failure, information such as the number of signal wavelength channels, and a usage state (whether or not a channel is "in use," whether or not there is residue, or the like) of an optical signal band.

For example, bands of 1500 to 1530 nm or 1600 nm are used in normal optical transmission devices as a wavelength λc of monitoring light. There is no special limitation to a wavelength of monitoring light unless it overlaps a signal wavelength, and band management may be performed using any other communication means than monitoring light. Particularly, when, for example, a configuration, performance, and a switching algorithm of each WSS node are already decided, a configuration of detecting both a switching state of each WSS node and usages states of wavelength grids according to a switching in a centralized management server and designating all wavelengths to be used as add light by the management server may be employed.

The reason for performing wavelength management will be described. Since the WSS node 100 simultaneously outputs residue other than a band adjacent to a selected and extracted signal channel, it is necessary to determine whether each wavelength grid is usable in terms of the presence or absence of residue. To this end, in the sixth embodiment, a channel usage state and the presence or absence of residue are monitored.

For example, when a new optical signal is added to a vacant wavelength of an optical signal of FIG. 18(2), it is necessary to prevent a use of a grid of a wavelength λ2 and a wavelength λ5 in which there is residue as well as a wavelength grid centering on wavelengths λ1 and λ2 in which there is signal light. The monitoring light 120-1 to 120-4 are used to manage a usage state of each channel.

FIG. 19 is a diagram illustrating an example of wavelength management information used by the WSS node 100 according to the sixth embodiment. This state is transmitted to a downward node as part of management information to be transmitted through the monitoring light 120-3 or transmitted to another node or optical transmission device through another information line as necessary.

FIG. 19(1) illustrates an example of wavelength management information when the channels 3 and 4 are not added in FIGS. 17 and 18, and the presence or absence of a signal of each wavelength channel and the presence or absence of residue are written. Of these, for the channels 2 and 5, in addition to the presence or absence of residue, up to information representing which of the long wavelength side and the short wavelength side of the channel the residue has occurred at is written. Thus, it is possible to manage a state change of residue in further detail according to a state of a WSS node at a subsequent stage.

The wavelength management information illustrated in FIG. 19 is transmitted to the transponder accommodating device 125 through a monitoring information transmission line 129. A wavelength setting circuit 126 determines a vacant wavelength (the channels 3 and 4 in this example) based on the received wavelength management information of FIG. 19(1), sets λ3 and λ4 as output wavelengths of the high spectral density optical transmitters 107-1 and 107-2, and outputs the output wavelengths. As a result, it is possible to prevent residue or signal light from interfering with add light.

FIG. 19(2) illustrates updated wavelength management information after add light is added. This management information represents wavelength usage information of the output WDM signal 104-3, and is transmitted to a downward optical transmission device of the output optical fiber line 103-3 through the monitoring light 120-3.

FIG. 20 is a diagram illustrating an example of a state transition table of the wavelength management information described with reference to FIG. 19. A state transition of the wavelength management information will be described below with reference to FIG. 20.

FIG. 20(1) illustrates a state transition table representing how a state of a channel i of a certain line changes when a signal of the channel i of the line is set to be not transmitted. When a wavelength is added or extracted as illustrated in FIGS. 19(2) and 19(3), it is desirable to update the wavelength management information for the corresponding line as in FIG. 20(1). In FIG. 20(1), a switching state of a WSS is illustrated, and an optical signal of the channel is assumed to be actually present as well.

For example, in FIG. 20(1), originally, when there is an optical signal of the channel i, any of the signal of the channel i, the residue, or the signal light does not occur regardless of a state of an adjacent channel. On the other hand, when the optical signal of the channel i is set to be not transmitted in the WSS node 100 and an optical signal of a channel i−1 at the short wavelength side is set to be transmitted (for example, a state of the channel 3 in the output optical fiber line 103-1 of FIG. 13(2)), the transmission band at the short wavelength side is set to be large, and as a result, a component of the optical signal of the channel i at the short wavelength side remains, and residue occurs at the short wavelength side of the channel i (a hatched portion in FIG. 20(1)).

FIG. 20(2) illustrates a state transition table when signal light of the channel i+1 is transmitted. Since the optical channel i is assumed to be transmitted only when the channel i is present under the above assumption, in principle, it is desirable to consider only when the channel i in a state representing that there is a signal. In this case, an output state represents that there is a signal. Although the channel is in any other state, when the channel i is set to a transmission state, since the transmission bandwidth is sufficiently larger than the channel i, the output state becomes identical to the original state of the channel i.

FIG. 20(3) illustrates a state change when the channel is added. In this case, the output state consistently changes to a state in which there is a signal.

As illustrated in FIG. 20, the WSS node 100 according to the sixth embodiment can manages the channel usage state including the presence or absence or a change of residue or the like in detail, and thus the vacant wavelength can be effectively used.

Figure 21:
FIG. 21 is a diagram illustrating another configuration example of the wavelength management information in the sixth embodiment.

FIG. 21 is a diagram illustrating another configuration example of the wavelength management information in the sixth embodiment. FIG. 21 illustrates an example of the management information when a transmission band is set for each sub grid as in FIG. 16 of the fourth embodiment.

In FIG. 21, since a band is already finely divided by sub grids and a part of a signal is consistently present in a sub grid, it is unnecessary to discern whether a signal included in a grid is signal light or residue, and it is enough by managing whether a sub grid is simply "in use" or "vacant." Thus, it is possible to manage the channel usage state more efficiently and easily.

The invention made by the present inventor(s) has been concretely described above based on the embodiments, but the present invention is not limited to the above embodiments, and various changes can be made within the scope not departing from the gist thereof.

REFERENCE SIGNS LIST

100 WSS node
101, 101-1 to 101-4 input optical fiber line
102 input signal
103-1 to 103-3 output optical fiber line
104-1 to 104-3 output WDM signal
106-1 to 106-3 optical node
107-1 to 107-6 high spectral density optical transmitter
109-1 to 109-7 coherent optical receiver
110-1 to 110-3 WSS
111-1 to 111-2 input port of WSS
112-1 to 112-3 output port of WSS
113-1 to 113-3 output port of WSS
114, 114-1, 114-2 optical splitter
115, 115-1, 115-2, 115-3, 115-4 optical coupler
116 output port of WSS
120-1, 120-2, 120-3, 120-4 monitoring light
121 monitoring light wavelength demultiplexing circuit
122-1, 122-2, 122-3 monitoring light wavelength multiplexing circuit
123 monitoring light information processing circuit
124-1, 124-2, 124-3 monitoring information
125 transponder accommodating device
126 wavelength setting circuit
127-1, 127-2, 127-3 monitoring light transmitter
128 monitoring optical receiver
129 monitoring information transmission line

The invention claimed is:

1. A wavelength division multiplexing (WDM) optical transmission device that performs wavelength division multiplexing on first and second optical signals whose wavelength bands on a wavelength spectrum are adjacent to each other such that wavelength band spacing on the wavelength spectrum is almost zero, and transmits the first and second optical signals via an optical fiber transmission path, comprising:
- a wavelength selective switch (WSS) node that selects any one of the first and second optical signals and distributes the selected optical signal to any one of first and second optical fiber transmission paths,
- wherein the WSS node performs the distributing such that a transmission bandwidth of a first transmission band when the first optical signal is output to the first optical fiber transmission path is larger than a wavelength spectrum width or an allocation frequency band of the first optical signal, and a transmission bandwidth of a second transmission band when the second optical signal is output to the second optical fiber transmission path is larger than a wavelength spectrum width or an allocation frequency band of the second optical signal, and
- the WSS node is configured to cause a sum of a transmission bandwidth of the first transmission band from a center wavelength of the first transmission band to a termination at a side facing the second transmission band and a transmission bandwidth of the second transmission band from a center wavelength of the second transmission band to a termination at a side facing the first transmission band to be larger than a wavelength spectrum width from a center wavelength of the first optical signal to a center wavelength of the second optical signal.

2. The WDM optical transmission device according to claim 1,
   wherein the WSS node is configured not to occur a change or an instantaneous interruption in an output path or an output state of the second optical signal when the output path or the output state of the first optical signal switches between a transmission state and a blocking state.

3. The WDM optical transmission device according to claim 2,
   wherein the WSS node includes first and second WSS nodes,
   the first WSS node distributes the first optical signal to the first optical fiber transmission path and blocks the second optical signal from being output to the first optical fiber transmission path, and
   the second WSS node distributes the second optical signal to the second optical fiber transmission path and blocks the first optical signal from being output to the second optical fiber transmission path.

4. The WDM optical transmission device according to claim 2,
   wherein the WSS node includes
   a first WSS connected with the first optical fiber transmission path in an 1:1 manner,
   a second WSS connected with second first optical fiber transmission path in an 1:1 manner, and
   an optical splitter that splits the optical signal into a number equal to the number of the WSSs and inputs split light to each of the WSSs,
   the first WSS extracts the first optical signal and outputs the first optical signal to the first optical fiber transmission path,
   the second WSS extracts the second optical signal and outputs the second optical signal to the second optical fiber transmission path.

5. The WDM optical transmission device according to claim 1,
   wherein the WSS node is configured to be able to change a transmission band in units of wavelength grids having a wavelength spectrum width narrower than the optical signal,
   the WSS node outputs the optical signal in the wavelength grid including a wavelength spectrum component of the second optical signal to the first optical fiber transmission path together when outputting the first optical signal to the first optical fiber transmission path, and
   the WSS node outputs the optical signal in the wavelength grid including a wavelength spectrum component of the first optical signal to the second optical fiber transmission path together when outputting the second optical signal to the second optical fiber transmission path.

6. The WDM optical transmission device according to claim 1,
   wherein the WSS node is configured to be able to change a transmission band in units of wavelength grids having a wavelength spectrum width narrower than the optical signal,
   the WSS node outputs the optical signal in the wavelength grid which includes a wavelength spectrum component of the first optical signal but includes no wavelength spectrum component of the second optical signal to the first optical fiber transmission path,
   the WSS node outputs the optical signal in the wavelength grid which includes the wavelength spectrum component of the second optical signal but includes no wavelength spectrum component of the first optical signal to the second optical fiber transmission path, and
   the WSS node simultaneously outputs the optical signal in the wavelength grid which includes both the wavelength spectrum component of the first optical signal and the wavelength spectrum component of the second optical signal to the first optical fiber transmission path and the second optical fiber transmission path.

7. The WDM optical transmission device according to claim 1,
   wherein the WSS node includes
   a first WSS that extracts the first optical signal,
   a second WSS that extracts the second optical signal,
   an optical splitter that splits the optical signal and inputs split light to each of the WSSs,
   a first optical coupler that couples an output optical signal output from the first WSS with an output optical signal output from the second WSS, and outputs the coupled output optical signal to the first optical fiber transmission path, and
   a second optical coupler that couples the output optical signal output from the first WSS with the output optical signal output from the second WSS, and outputs the coupled output optical signal to the second optical fiber transmission path,
   the first WSS outputs the extracted first optical signal to the first optical coupler, and
   the second WSS outputs the extracted second optical signal to the second optical coupler.

8. The WDM optical transmission device according to claim 1,
   wherein the WSS node includes an information line used to transmit monitoring information to a downward node of the optical fiber transmission path or transfer monitoring information received from a high-level node to a network monitoring node, the information line being arranged on the optical fiber transmission path, and the WSS node transmits monitoring information on a presence or absence of an optical signal and a presence or absence of residue for each wavelength band to the downward node or the network monitoring node using the information line.

9. The WDM optical transmission device according to claim 1,
wherein the WSS node includes an information line used to transmit monitoring information to a downward node of the optical fiber transmission path or transfer monitoring information received from a high-level node to a network monitoring node, the information line being arranged on the optical fiber transmission path, and
the WSS node transmits monitoring information on a presence or absence of an optical signal and a presence or absence of residue for each wavelength grid having a wavelength spectrum width narrower than the optical signal to the downward node or the network monitoring node using the information line.

10. The WDM optical transmission device according to claim 1,
wherein the WSS node receives monitoring information on a presence or absence of an optical signal and a presence or absence of residue in the optical fiber transmission path for each wavelength band or for each wavelength grid having a wavelength spectrum width narrower than the optical signal from a upward node of e optical fiber transmission path or a network monitoring node, and
the WSS node adds the optical signal to the optical fiber transmission path after checking that there is neither other optical signal nor residue in a wavelength band occupied by the optical signal based on the monitoring information.

11. A WDM optical transmission system, comprising:
a transmitter that transmits the first and second optical signals;
the WDM optical transmission device according to claim 1; and
a receiver that receives an optical signal output from the WDM optical transmission device.

12. The WDM optical transmission system according to claim 11,
wherein the transmitter transmits at least one of the first and second optical signals as any one of an optical signal having approximately a rectangular spectral shape, an optical multilevel modulation signal obtained by performing Nyquist filtering, a multicarrier signal obtained by modulating each of a plurality of optical carriers by an information signal, and an optical OFDM signal, and
the receiver converts an optical signal output from the WDM optical transmission device into an electrical signal having a wavelength spectrum equivalent to the optical signal, and selectively receives only a signal within a certain wavelength band included in the electrical signal.

13. The WDM optical transmission system according to claim 12,
wherein the receiver receives the optical signal output from the WDM optical transmission device using coherent detection.

14. A WDM optical transmission method of performing wavelength division multiplexing on first and second optical signals whose wavelength bands on a wavelength spectrum are adjacent to each other such that wavelength band spacing on the wavelength spectrum is almost zero and transmitting the first and second optical signals via an optical fiber transmission path, the method comprising:
a wavelength selective switching step of selecting any one of the first and second optical signals and distributing the selected optical signal to any one of first and second optical fiber transmission paths,
wherein the wavelength selective switching step comprises performing the distributing such that a transmission bandwidth of a first transmission band when the first optical signal is output to the first optical fiber transmission path is larger than a wavelength spectrum width or an allocation frequency band of the first optical signal, and a transmission bandwidth of a second transmission band when the second optical signal is output to the second optical fiber transmission path is larger than a wavelength spectrum width or an allocation frequency band of the second optical signal, and
causing a sum of a transmission bandwidth of the first transmission band from a center wavelength of the first transmission band to a termination at a side facing the second transmission band and a transmission bandwidth of the second transmission band from a center wavelength of the second transmission band to a termination at a side facing the first transmission band to be larger than a wavelength spectrum width from a center wavelength of the first optical signal to a center wavelength of the second optical signal when the distributing is performed.

* * * * *